(12) United States Patent
Muratani

(10) Patent No.: US 7,542,215 B2
(45) Date of Patent: Jun. 2, 2009

(54) ZOOM LENS SYSTEM AND OPTICAL APPARATUS USING THE SAME

(75) Inventor: Mami Muratani, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/934,765

(22) Filed: Nov. 3, 2007

(65) Prior Publication Data

US 2008/0106802 A1     May 8, 2008

(30) Foreign Application Priority Data

Nov. 8, 2006    (JP)    ............................ 2006-302936
Oct. 3, 2007    (JP)    ............................ 2007-260087

(51) Int. Cl.
*G02B 15/14* (2006.01)
*G02B 13/18* (2006.01)

(52) U.S. Cl. ........................ 359/691; 359/708; 359/717; 359/683

(58) Field of Classification Search ................. 359/691, 359/680, 682, 683, 708, 714, 717
See application file for complete search history.

(56) References Cited

U.S. PATENT DOCUMENTS

| | | |
|---|---|---|
| 4,993,814 A | 2/1991 | Hata |
| 6,025,961 A | 2/2000 | Kohno et al. |
| 6,124,987 A | 9/2000 | Kayanuma et al. |
| 6,275,342 B1 | 8/2001 | Sakamoto et al. |
| 6,967,783 B2 | 11/2005 | Noda |
| 7,054,072 B2 | 5/2006 | Sato |
| 7,177,096 B2 | 2/2007 | Enomoto |
| 7,310,192 B2 * | 12/2007 | Nagai et al. ................. 359/691 |
| 2006/0103946 A1 | 5/2006 | Nagai et al. |

FOREIGN PATENT DOCUMENTS

| | | |
|---|---|---|
| JP | 4-46308 A | 2/1992 |
| JP | 4-46310 A | 2/1992 |
| JP | 4-56814 A | 2/1992 |
| JP | 08-122638 A | 5/1996 |
| JP | 09-033809 A | 2/1997 |
| JP | 10-274739 A | 10/1998 |
| JP | 2000-9997 A | 1/2000 |
| JP | 2001-215407 A | 8/2001 |
| JP | 2003-131128 A | 5/2003 |

(Continued)

*Primary Examiner*—William C Choi
*Assistant Examiner*—Jack Dinh
(74) *Attorney, Agent, or Firm*—Miles & Stockbridge P.C.

(57) ABSTRACT

A zoom lens system excellently correcting various aberrations with accomplishing compactness, lightweight, and slimness upon accommodating lens barrel. The system consists of, in order from an object, a first group G1 having negative power, and a second group G2 having positive power. Upon zooming from a wide-angle end to a telephoto end, a distance between the first group G1 and the second group G2 decreases. The first group G1 consists of, in order from the object, a first lens L1 with negative power, and a second lens L2 with positive power. The second group G2 consists of three lenses that are, in order from the object, a third lens L3 with positive power, a fourth lens L4 with negative power having a convex surface facing the object, a fifth lens L5 with positive power. The three lenses are disposed without cemented each other. Given condition is satisfied.

21 Claims, 12 Drawing Sheets

FOREIGN PATENT DOCUMENTS

| | | |
|---|---|---|
| JP | 2005-300858 A | 10/2005 |
| JP | 2005-316181 A | 11/2005 |
| JP | 2006/023679 A | 1/2006 |
| JP | 2006-091082 A | 4/2006 |
| JP | 2006-145762 A | 6/2006 |
| JP | 2006-171429 A | 6/2006 |

* cited by examiner

ZOOM LENS SYSTEM AND OPTICAL APPARATUS USING THE SAME

The disclosure of the following priority applications are herein incorporated by reference:

Japanese Patent Application No. 2006-302936 filed on Nov. 8, 2006, and

Japanese Patent Application No. 2007-260087 filed on Oct. 3, 2007.

BACKGROUND OF THE INVENTION

1. Field of the Invention

The present invention relates to a zoom lens system and an optical apparatus using the zoom lens system.

2. Related Background Art

With increasing miniaturizing trend of a digital camera, an optical system loaded thereon has strongly been required to be compact and lightweight to increase portability. With increasing integration of a solid-state imaging device, there has been required a zoom lens system capable of providing high contrast with respect to a higher spatial frequency. There has been proposed a negative-leading zoom lens system suitable for a compact digital camera using such a solid-state imaging device in Japanese Patent Application Laid-Open No. 2000-9997.

However, in the zoom lens system disclosed in Japanese Patent Application Laid-Open No. 2000-9997, the thickness of each lens composing the zoom lens system is relatively large, so that it becomes difficult to accomplish to be compact, lightweight, and slim when the zoom lens system is accommodated in a camera body.

SUMMARY OF THE INVENTION

The present invention is made in view of the aforementioned problems and has an object to provide a zoom lens system excellently correcting various aberrations with accomplishing to be compact, lightweight, and slim upon being accommodated, and to provide an optical apparatus using the zoom lens system.

According to a first aspect of the present invention, there is provided a zoom lens system consisting of, in order from an object: a first lens group having negative refractive power; and a second lens group having positive refractive power; upon varying a focal length from a wide-angle end state to a telephoto end state, a distance between the first lens group and the second lens group decreasing; the first lens group consisting of, in order from the object, a first lens having negative refractive power, and a second lens having positive refractive power; the second lens group consisting of three lenses that are, in order from the object, a third lens having positive refractive power, a fourth lens having negative refractive power and having a convex surface facing the object, and a fifth lens having positive refractive power; the three lenses being disposed without cemented with each other; and the following conditional expression (1) is satisfied:

$$-1.48<(r2+r1)/(r2-r1)<-1.00 \quad (1)$$

where r1 denotes a radius of curvature of the object side surface of the fourth lens, and r2 denotes a radius of curvature of the image side surface of the fourth lens.

In a zoom lens system according to the first aspect of the present invention, the following conditional expression (2) is preferably satisfied:

$$0.20<S1/ft<0.32 \quad (2)$$

where S1 denotes a thickness of the first lens group, and ft denotes a focal length of the zoom lens system in the telephoto end state.

In a zoom lens system according to the first aspect of the present invention, the following conditional expression (3) is preferably satisfied:

$$1.00<Fw \times fw/(-f1)<1.90 \quad (3)$$

where Fw denotes a f-number of the zoom lens system in the wide-angle end state, fw denotes a focal length of the zoom lens system in the wide-angle end state, and f1 denotes a focal length of the zoom lens system.

In a zoom lens system according to the first aspect of the present invention, the following conditional expression (4) is preferably satisfied:

$$0.20<S2/ft<0.35 \quad (4)$$

where S2 denotes a thickness of the second lens group, and ft denotes a focal length of the zoom lens system in the telephoto end state.

In a zoom lens system according to the first aspect of the present invention, the following conditional expression (5) is preferably satisfied:

$$20<v3-v4<37 \quad (5)$$

where v3 denotes Abbe number of the third lens at d-line, in which the wavelength λ=587.6 nm, v4 denotes Abbe number of the fourth lens at d-line, in which the wavelength λ=587.6 nm.

In a zoom lens system according to the first aspect of the present invention, it is preferable that the third lens has an aspherical surface.

In a zoom lens system according to the first aspect of the present invention, it is preferable that the image side surface of the third lens is an aspherical surface.

In a zoom lens system according to the first aspect of the present invention, it is preferable that the image side surface of the first lens is an aspherical surface.

In a zoom lens system according to the first aspect of the present invention, it is preferable that the fifth lens is a meniscus lens having a concave surface facing the object.

In a zoom lens system according to the first aspect of the present invention, it is preferable that refractive index of the fourth lens is 1.80 or more.

According to a second aspect of the present invention, there is provided an optical apparatus equipped with the zoom lens system according to the first aspect.

According to a third aspect of the present invention, there is provided a method for varying a focal length of a zoom lens system, the method comprising steps of: providing the zoom lens system that consists of, in order from an object, a first lens group having negative refractive power, and a second lens group having positive refractive power, the first lens group consisting of, in order from the object, a first lens having negative refractive power and a second lens having positive refractive power, the second lens group consisting of three lenses that are, in order from the object, a third lens having positive refractive power, a fourth lens having negative refractive power, and a fifth lens having positive refractive power, the three lenses in the second lens group being not cemented with each other, the following conditional expression (1) being satisfied:

$$-1.48<(r2+r1)/(r2-r1)<-1.00 \quad (1)$$

where r1 denotes a radius of curvature of the object side surface of the fourth lens, and r2 denotes a radius of curvature of the image side surface of the fourth lens; and varying a focal length from a wide-angle end state to a telephoto end state by decreasing a distance between the first lens group and the second lens group.

In the third aspect of the present invention, the following conditional expression (2) is preferably satisfied:

$$0.20 < S1/ft < 0.32 \qquad (2)$$

where S1 denotes a thickness of the first lens group, and ft denotes a focal length of the zoom lens system in the telephoto end state.

In the third aspect of the present invention, the following conditional expression (3) is preferably satisfied:

$$1.00 < Fw \times fw/(-f1) < 1.90 \qquad (3)$$

where Fw denotes a f-number of the zoom lens system in the wide-angle end state, fw denotes a focal length of the zoom lens system in the wide-angle end state, and f1 denotes a focal length of the zoom lens system.

In the third aspect of the present invention, the following conditional expression (4) is preferably satisfied:

$$0.20 < S2/ft < 0.35 \qquad (4)$$

where S2 denotes a thickness of the second lens group, and ft denotes a focal length of the zoom lens system in the telephoto end state.

In the third aspect of the present invention, the following conditional expression (5; is preferably satisfied:

$$20 < v3 - v4 < 37 \qquad (5)$$

where v3 denotes Abbe number of the third lens at d-line, in which the wavelength λ=587.6 nm, v4 denotes Abbe number of the fourth lens at d-line, in which the wavelength λ=587.6 nm.

In the third aspect of the present invention, it is preferable that the third lens has an aspherical surface.

In the third aspect of the present invention, it is preferable that the image side surface of the third lens is an aspherical surface.

In the third aspect of the present invention, it is preferable that the image side surface of the first lens is an aspherical surface.

In the third aspect of the present invention, it is preferable that the fifth lens has a meniscus shape having a concave surface facing the object.

In the third aspect of the present invention, it is preferable that refractive index of the fourth lens is 1.80 or more.

The present invention can provide a zoom lens system excellently correcting various aberrations with accomplishing to be compact, lightweight, and slim upon being accommodated, and to provide an optical apparatus using the zoom lens system.

BRIEF DESCRIPTION OF THE DRAWINGS

FIGS. 1A and 1B are diagrams showing an electronic still camera which is equipped with a zoom lens system according to the present embodiment explained later, in which FIG. 1A is a front view and FIG. 1B is a rear view.

FIGS. 4A, 4B and 4C are graphs showing various aberrations of the zoom lens system according to Example 1 upon focusing on infinity, in which FIG. 4A shows a wide-angle end state, FIG. 4B shows an intermediate focal length state, and FIG. 4C shows a telephoto end state.

FIGS. 6A, 6B and 6C are graphs showing various aberrations of the zoom lens system according to Example 2 upon focusing on infinity, in which FIG. 6A shows a wide-angle end state, FIG. 6B shows an intermediate focal length state, and FIG. 6C shows a telephoto end state.

FIGS. 8A, 8B and 8C are graphs showing various aberrations of the zoom lens system according to Example 3 upon focusing on infinity, in which FIG. 8A shows a wide-angle end state, FIG. 8B shows an intermediate focal length state, and FIG. 8C shows a telephoto end state.

FIGS. 10A, 10B and 10C are graphs showing various aberrations of the zoom lens system according to Example 4 upon focusing on infinity, in which FIG. 10A shows a wide-angle end state, FIG. 10B shows an intermediate focal length state, and FIG. 10C shows a telephoto end state.

FIGS. 12A, 12B and 12C are graphs showing various aberrations of the zoom lens system according to Example 5 upon focusing on infinity, in which FIG. 12A shows a wide-angle end state, FIG. 12B shows an intermediate focal length state, and FIG. 12C shows a telephoto end state.

DETAILED DESCRIPTION OF THE MOST PREFERRED EMBODIMENT

The present embodiment is going to be explained below.

Figure 1A:
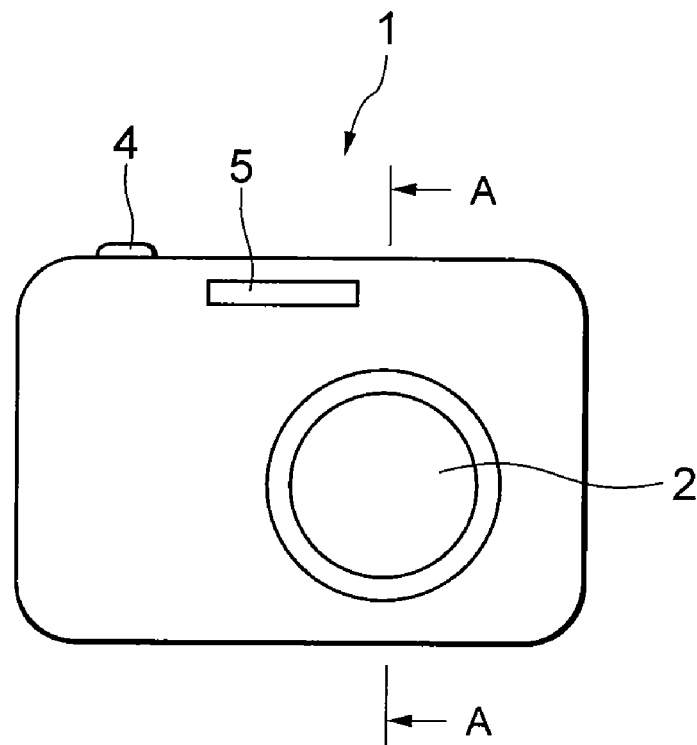
Figure 1B:
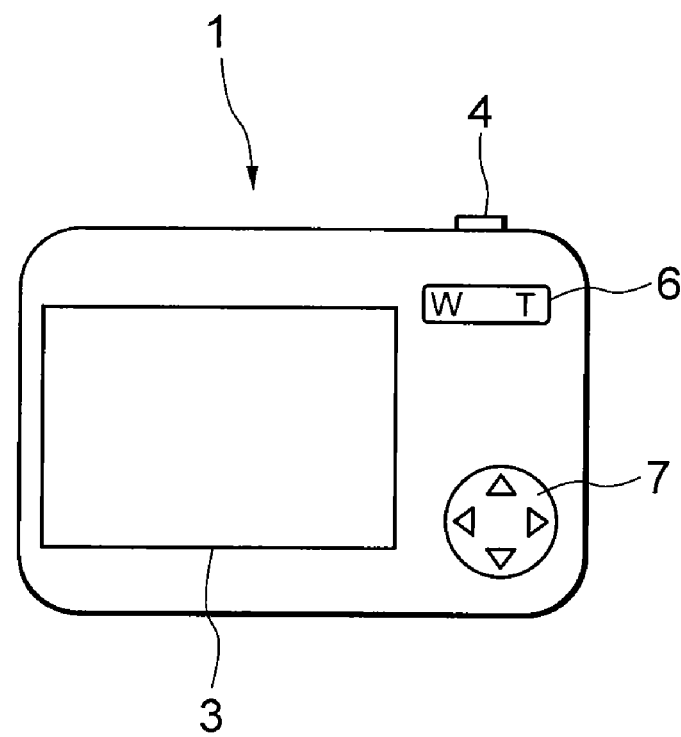
Figure 2:
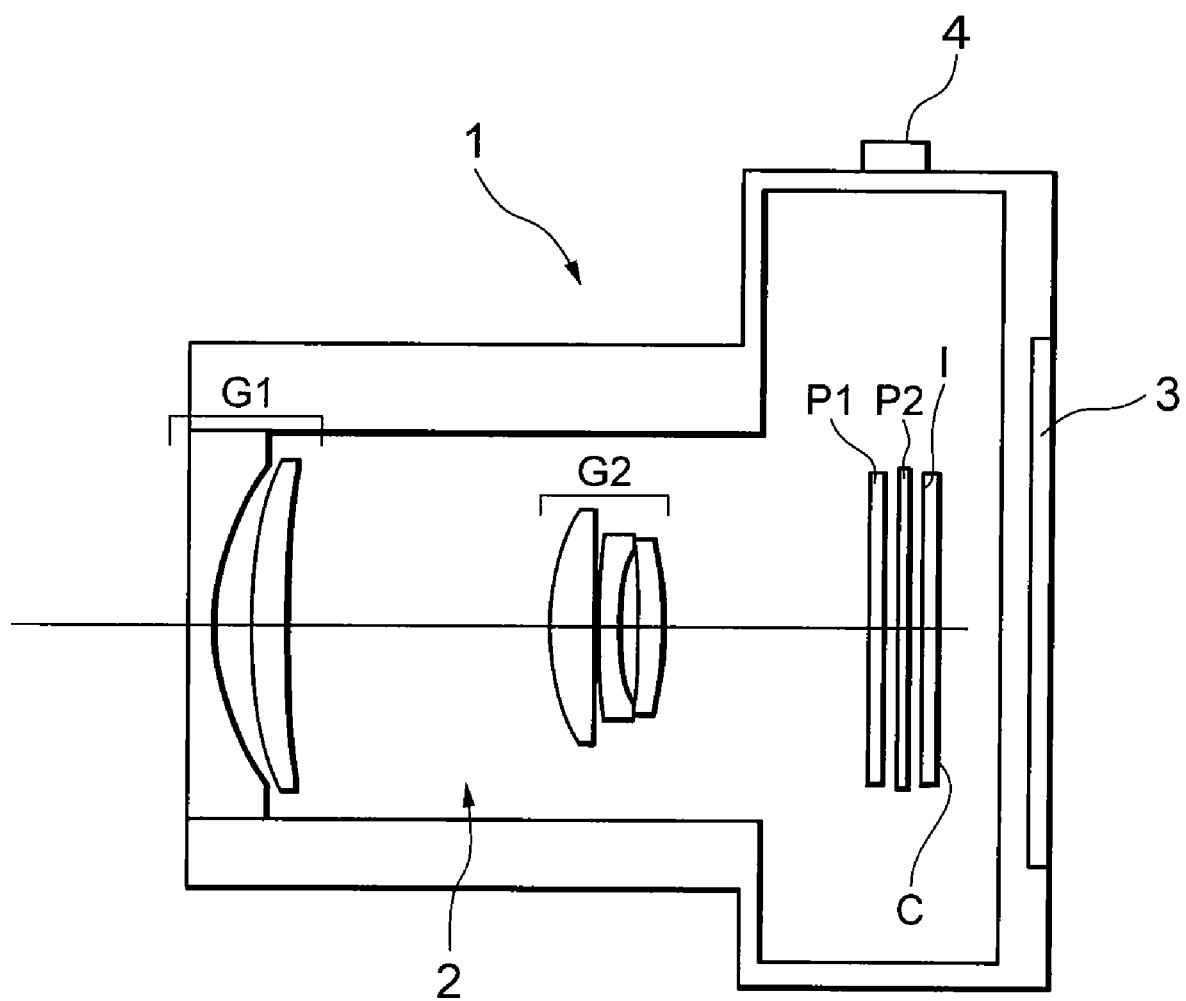
FIG. 2 is a cross-sectional view along the A-A line in FIG. 1A.

FIGS. 1A and 1B are diagrams showing an electronic still camera equipped with a zoom lens system according to a present embodiment, which is explained later, in which FIG. 1A is a front view and FIG. 1B is a rear view. FIG. 2 is a cross-sectional view along the A-A line in FIG. 1A.

In an electronic still camera 1 (hereinafter called a camera) according to the present embodiment shown in FIGS. 1A, 1B and 2, when a power switch button (not shown) is pressed, a shutter (not shown) is opened and light from a subject (not shown) is collected by an image-taking lens 2 and an image is formed on an imaging device C (such as CCD, CMOS, and the like) disposed on an image plane I. The subject image formed on the imaging device C is displayed on a liquid crystal monitor 3 disposed backside of the camera 1. After fixing the composition of the subject image with observing the liquid crystal monitor 3, a photographer depresses a release button 4 to take a picture of the subject image by the imaging device C, and stores in a memory (not shown).

The image-taking lens 2 is composed of a zoom lens system 2 according to the present embodiment explained later. Moreover, in the camera 1, there are disposed such as an auxiliary light emitter 5 that emits auxiliary light when the subject is dark, a W-T button 6 that makes the zoom lens system, which is the image-taking lens 2, zoom from a wide-angle end state (W) to a telephoto end state (T), and a function button 7 that is used for setting various conditions of the camera 1.

In this manner, the camera 1 equipped with the zoom lens system 2 according to the present embodiment explained later is composed.

Then, a zoom lens system according to the present embodiment is explained below.

A zoom lens system according to the present embodiment consists of, in order from an object, a first lens group having negative refractive power, and a second lens group having positive refractive power. When a state of the focal length varies from a wide-angle end state to a telephoto end state, the first lens group and the second lens group are moved along an optical axis such that a distance between the first lens group and the second lens group decreases.

The first lens group having negative refractive power consists of two lenses that are, in order from the object, a first lens having negative refractive power and a second lens having positive refractive power.

In such a negative-positive two-lens-group zoom lens system, to make larger the dimension of the first lens group directly affects the dimension of the whole zoom lens system. In consideration of compactness of the camera, the first lens group should be made slim and small as much as possible. In a first lens group of a negative-positive two-lens-group zoom lens system, negative distortion and coma generated in the wide-angle end state are usually corrected by widening a distance between the first lens having negative refractive power and the second lens having positive refractive power, so that the first lens group tends to become thick.

In a zoom lens system according to the present embodiment, the second lens group having positive refractive power consists of three lenses that are, in order from the object, a third lens having positive refractive power, a fourth lens having negative refractive power with a convex surface facing the object, and a fifth lens having positive refractive power. The three lenses are not cemented with each other. With this configuration, the second lens group becomes a triplet type, so that aberrations are corrected well.

With properly constructing lens shapes in the second lens group, the zoom lens system according to the present embodiment makes it possible to accomplish slimness and compactness of the zoom lens system with excellently correcting various aberrations by narrowing the distance between the first lens having negative refractive power and the second lens having positive refractive power disposed in the first lens group.

In a zoom lens system according to the present embodiment, the following conditional expression (1) is preferably satisfied:

$$-1.48 < (r2+r1)/(r2-r1) < -1.00 \quad (1)$$

where r1 denotes a radius of curvature of the object side surface of the fourth lens in the second lens group, and r2 denotes a radius of curvature of the image side surface of the fourth lens in the second lens group.

Conditional expression (1) defines an appropriate range of a shape factor of the fourth lens having negative refractive power in the second lens group. When the ratio $(r2+r1)/(r2-r1)$ is equal to or falls below the lower limit of conditional expression (1), the radius of curvature of the image side surface of the fourth lens becomes too large, so that it becomes difficult to correct Petzval sum. In addition, the second lens group becomes too thick. On the other hand, when the ratio $(r2+r1)/(r2-r1)$ is equal to or exceeds the upper limit of conditional expression (1), the radius of curvature of the image side surface of the fourth lens becomes too small and deviation of an exit ray from the surface tend to become too large, so that various aberrations such as coma are severely generated. In order to secure the effect of the present embodiment, it is preferable to set the lower limit of conditional expression (1) to −1.40. In order to secure the effect of the present embodiment, it is preferable to set the upper limit of conditional expression (1) to −1.10.

In a zoom lens system according to the present embodiment, the following conditional expression (2) is preferably satisfied:

$$0.20 < S1/ft < 0.32 \quad (2)$$

where S1 denotes a thickness of the first lens group, and ft denotes a focal length of the zoom lens system in the telephoto end state.

Conditional expression (2) defines an appropriate range of the thickness of the first lens group. When the ratio S1/ft is equal to or falls below the lower limit of conditional expression (2), the thickness of the first lens group becomes too narrow, so that negative distortion in the wide-angle end state increases and it becomes difficult to correct lateral chromatic aberration in the wide-angle end state. When the focal length of the first lens group is made longer to secure good aberration correction, the total lens length and the moving amount of each lens group become large, so that it becomes difficult to make the zoom lens system compact. On the other hand, when the ratio S1/ft is equal to or exceeds the upper limit of conditional expression (2), the focal length of the zoom lens system in the telephoto end state becomes too small, so that it becomes difficult to obtain a sufficient zoom ratio. Moreover, the thickness of the first lens group becomes too large, so that in order to set the total lens length of the zoom lens system to a given length, the thickness of the second lens group has to be reduced at that rate. Accordingly, it becomes difficult to correct spherical aberration and coma. In order to secure the effect of the present embodiment, it is preferable to set the upper limit of conditional expression (2) to 0.29.

In a zoom lens system according to the present embodiment, the following conditional expression (3) is preferably satisfied:

$$1.00 < Fw \times fw/(-f1) < 1.90 \quad (3)$$

where Fw denotes an f-number of the zoom lens system in the wide-angle end state, fw denotes a focal length of the zoom lens system in the wide-angle end state, and f1 denotes a focal length of the first lens group.

Conditional expression (3) defines an appropriate range of a ratio of the focal length of the first lens group to the f-number. When the value $Fw \times fw/(-f1)$ is equal to or falls below the lower limit of conditional expression (3), the focal length of the first lens group becomes too long, so that the total lens length of the zoom lens system becomes large. Moreover, the focal length of the second lens group becomes relatively short, so that the radius of curvature of each lens composing the second lens group becomes short. Accordingly, it becomes difficult to correct spherical aberration and coma. On the other hand, when the value Fw×fw/(−f1) is equal to or exceeds the upper limit of conditional expression (3), the f-number of the zoom lens system in the wide-angle end state becomes large, or the focal length in the wide-angle end state becomes large, so that the angle of view becomes narrow. Moreover, the focal length of the first lens group becomes too short, and the radius of curvature of the negative lens in the first lens group becomes short, so that it becomes difficult to correct lateral chromatic aberration. In order to secure the effect of the present embodiment, it is preferable to set the lower limit of conditional expression (3) to 1.20. In order to secure the effect of the present embodiment, it is preferable to set the upper limit of conditional expression (3) to 1.70.

In a zoom lens system according to the present embodiment, the following conditional expression (4) is preferably satisfied:

$$0.20 < S2/ft < 0.35 \quad (4)$$

where S2 denotes the thickness of the second lens group, and ft denotes the focal length of the zoom lens system in the telephoto end state.

Conditional expression (4) defines an appropriate range of the thickness of the second lens group. When the ratio S2/ft is equal to or falls below the lower limit of conditional expression (4), the thickness of the second lens group becomes too thin, so that it becomes difficult to excellently correct spherical aberration and coma. On the other hand, when the ratio S2/ft is equal to or exceeds the upper limit of conditional expression (4), the focal length in the telephoto end state becomes too small, so that it becomes difficult to obtain a sufficient zoom ratio. Moreover, the thickness of the second lens group becomes too thick, so that in order to set the total lens length of the zoom lens system to a predetermined length, the thickness of the first lens group has to be thin at that rate. As a result, it becomes difficult to correct lateral chromatic aberration and distortion. In order to secure the effect of the present embodiment, it is preferable to set the lower limit of conditional expression (4) to 0.23. In order to secure the effect of the present embodiment, it is preferable to set the upper limit of conditional expression (4) to 0.33.

In a zoom lens system according to the present embodiment, the following conditional expression (5) is preferably satisfied:

$$20 < v3 - v4 < 37 \quad (5)$$

where v3 denotes Abbe number of the third lens having positive refractive power in the second lens group at d-line in which the wavelength λ=587.6 nm, and v4 denotes Abbe number of the fourth lens having negative refractive power in the second lens group at d-line in which the wavelength λ=587.6 nm.

Conditional expression (5) defines Abbe numbers of the glass materials of the third lens and the fourth lens in the second lens group. When the value v3−v4 is equal to or falls below the lower limit of conditional expression (5), Abbe numbers of the third lens and the fourth lens become too close, so that lateral chromatic aberration generated by the third lens having positive refractive power becomes difficult to be excellently corrected by the fourth lens having negative refractive power. On the other hand, when the value v3−v4 is equal to or exceeds the upper limit of conditional expression (5), lateral chromatic aberration at g-line (wavelength λ=435.8 nm) in the telephoto end state is separated in the positive direction, so that it becomes difficult to excellently correct longitudinal chromatic aberration over entire zoom range. In order to secure the effect of the present embodiment, it is preferable to set the lower limit of conditional expression (5) to 22. In order to secure the effect of the present embodiment, it is preferable to set the upper limit of conditional expression (5) to 33.

In a zoom lens system according to the present embodiment, the third lens, which is the most object side lens of the second lens group, preferably has an aspherical surface. With disposing an aspherical surface in the third lens, it becomes possible to excellently correct spherical aberration and coma.

In a zoom lens system according to the present embodiment, the image side surface of the third lens, which is the most object side lens of the second lens group, is preferably an aspherical surface. With such configuration, it becomes possible to excellently correct spherical aberration and coma.

In a zoom lens system according to the present embodiment, the image side surface of the first lens, which is the most object side lens of the first lens group, is preferably an aspherical surface. When the first lens group is a negative-positive two-lens configuration, with forming an aspherical surface on the image side surface of the first lens, which is disposed the most object side with negative refractive power, it becomes possible to excellently correct negative distortion in the wide-angle end state.

In a zoom lens system according to the present embodiment, the fifth lens, which is the most image side lens in the second lens group, is preferably a meniscus lens having a concave surface facing the object. When the concave surface of the fifth lens having positive refractive power is made to face the object, the second lens group as a whole becomes similar to the Gauss type lens configuration. Accordingly, even if the distance between the first lens having negative refractive power and the second lens having positive refractive power is narrowed, it becomes possible to excellently correct aberrations.

In a zoom lens system according to the present embodiment, the image side surface of the fifth lens is preferably an aspherical surface. With this configuration, it becomes possible to excellently correct spherical aberration and coma.

In a zoom lens system according to the present embodiment, it is preferable that refractive index of the fourth lens in the second lens group is 1.80 or more. With this configuration, it becomes possible to effectively correct Petzval sum with securing negative refractive power of the fourth lens. In order to secure the effect of the present embodiment, it is suitable to set refractive index of the fourth lens to 1.84 or more. In order to further secure the effect of the present embodiment, it is more suitable to set refractive index of the fourth lens to 1.90 or more. In order to still further secure the effect of the present embodiment, it is still more suitable to set refractive index of the fourth lens to 2.00 or more.

Although a zoom lens system according to the present embodiment preferably consists of five lens elements, it may suitably include an optical member transmitting light such as a glass plate within limits that do not deteriorate optical performance.

In a zoom lens system according to the present embodiment, an air space between the first lens and the second lens in the first lens group is preferably an air lens having a meniscus shape in which the curvature of the object side surface is stronger than that of the image side surface. With this configuration, it becomes possible to correct negative distortion and coma generated in the wide-angle end state by means of widening the distance between the first lens and the second lens as much as possible with avoiding the first lens to become thick.

In a zoom lens system according to the present embodiment, the following conditional expression (6) is preferably satisfied:

$$7.0 < Z \times (S1/d1) < 7.8 \quad (6)$$

where Z denotes a zoom ratio that the focal length of the zoom lens system in the telephoto end state ft is divided by that in the wide-angle end state fw, d1 denotes a distance between the image side surface of the first lens and the object side surface of the second lens in the first lens group, and S1 denotes a thickness of the first lens group.

Conditional expression (6) defines a relation between the thickness of the first lens group and the distance between the first lens and the second lens. When the value Z×(S1/d1) is equal to or exceeds the upper limit of conditional expression (6), the distance between the first lens and the second lens becomes too small, so that it becomes difficult to correct coma and astigmatism. On the other hand, when the value Z×(S1/d1) is equal to or falls below the lower limit of conditional expression (6), the zoom ratio Z becomes small and it becomes difficult to correct chromatic aberration. In order to secure the effect of the present embodiment, it is preferable to set the lower limit of conditional expression (6) to 7.2. In order to secure the effect of the present embodiment, it is preferable to set the upper limit of conditional expression (6) to 7.65.

In a zoom lens system according to the present embodiment, it is preferable to choose a method for varying a focal length of a zoom lens system, the method comprising steps of: providing the zoom lens system that consists of, in order from an object, a first lens group having negative refractive power, and a second lens group having positive refractive power, the first lens group consisting of, in order from the object, a first lens having negative refractive power and a second lens having positive refractive power, the second lens group consisting of three lenses that are, in order from the object, a third lens having positive refractive power, a fourth lens having negative refractive power, and a fifth lens having positive refractive power, the three lenses from the third lens to the fifth lens in the second lens group not being cemented with each other, the above-mentioned conditional expression (1) being satisfied; and varying a focal length from a wide-angle end state to a telephoto end state by decreasing a distance between the first lens group and the second lens group. With choosing such a method for varying a focal length, it becomes possible to make the total lens length of the zoom lens system in the telephoto end state shorter than that in the wide-angle end state, so that compactness and lightweight of the zoom lens system can be accomplished.

Each example according to the present embodiment is explained below.

EXAMPLE 1

Figure 3:
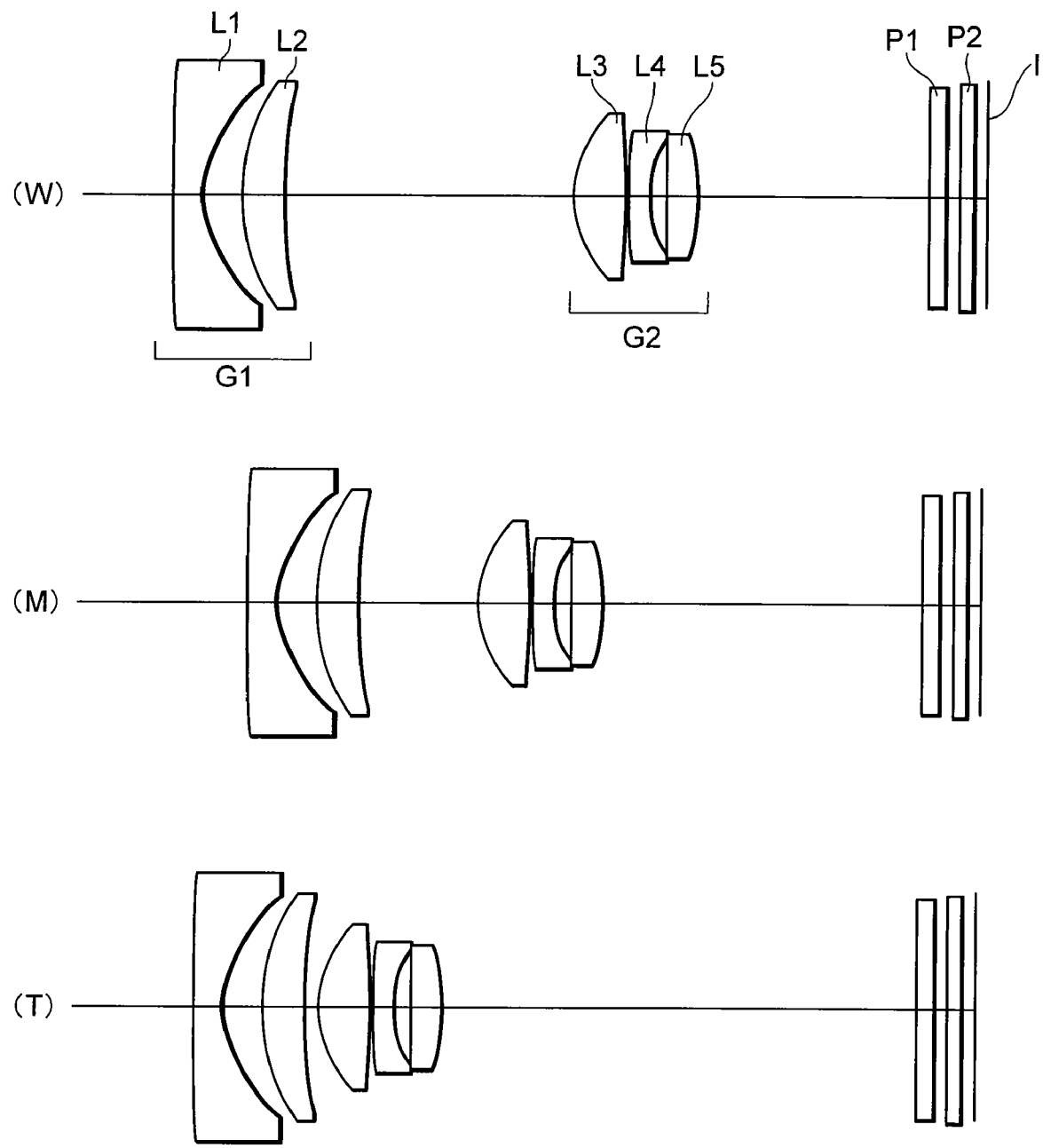
FIG. 3 is a diagram showing a lens configuration of a zoom lens system according to Example 1 of the present embodiment, in which W denotes a wide-angle end state, M denotes an intermediate focal length state, and T denotes a telephoto end state.

FIG. 3 is a diagram showing a lens configuration of a zoom lens system according to Example 1, in which W denotes a wide-angle end state, M denotes an intermediate focal length state, and T denotes a telephoto end state.

In FIG. 3, the zoom lens system according to Example 1 is composed of, in order from an object, a first lens group G1 having negative refractive power, and a second lens group G2 having positive refractive power. Upon varying a focal length from a wide-angle end state to a telephoto end state, the first lens group G1 and the second lens group G2 are moved along an optical axis such that a distance between the first lens group G1 and the second lens group G2 decreases.

The first lens group G1 has negative refractive power as a whole, and is composed of two lenses that are, in order from the object, a negative meniscus lens L1 having a convex surface facing the object, and a positive meniscus lens L2 having a convex surface facing the object.

The second lens group G2 has positive refractive power as a whole, and is composed of three lenses that are, in order from the object, a double convex positive lens L3, a negative meniscus lens L4 having a convex surface facing the object, and a positive meniscus lens L5 having a concave surface facing the object. The three lenses are disposed without cemented with each other.

Between the second lens group G2 and the image plane I, there are provided a low-pass filter P1 for blocking higher spatial frequencies than that of resolution limit of a solid-state imaging device such as CCD disposed on the image plane I and a cover glass P2 for protecting the solid-state imaging device.

Various values associated with the zoom lens system according to Example 1 are listed in Table 1.

In [Specifications], f denotes a focal length, and FNO denotes an f-number, 2ω denotes an angle of view (unit: degree), and Bf denotes a back focal length.

In [Lens Data], the first column shows the lens surface number counted in order from the object side, the second column "r" shows a radius of curvature of the lens surface, the third column "d" shows a distance to the next lens surface along the optical axis, the fourth column "vd" shows Abbe number of the medium at d-line (wavelength λ=587.6 nm), and the fifth column "nd" shows refractive index of the medium at d-line (wavelength λ=587.6 nm). In the second column "r", "r=0.000" denotes a plane surface. Refractive index of the air nd=1.000000 is omitted.

In [Aspherical Data], an aspherical surface is exhibited by the following expression:

$$X(y) = y^2/[R \cdot \{1+(1-\kappa \cdot y^2/R^2)^{1/2}\}] + C4 \cdot y^4 + C6 \cdot y^6 + C8 \cdot y^8 + C10 \cdot y^{10}$$

where y denotes a vertical height from the optical axis, X(y) denotes a sag amount which is a distance along the optical axis from the tangent surface at the vertex of the aspherical surface to the aspherical surface at the vertical height y from the optical axis, R denotes a radius of curvature of a reference sphere (paraxial radius of curvature), K denotes a conical coefficient, and Cn denotes aspherical coefficient of n-th order. In [Aspherical Data], "E-n" denotes "×10$^{-n}$". The position of an aspherical surface is expressed by attaching "*" to the right side of the surface number and a radius of curvature of a reference sphere is shown in the second column "r".

In [Variable Distances], a focal length f, the distance between the object and the most object side lens surface D0, values for respective variable distances with respect to wide-angle end state W, intermediate focal length state M, and telephoto end stat T are shown. In [Values for Conditional Expressions], values for respective conditional expressions are shown.

In the tables for various values, unless otherwise specified, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used.

The explanation of reference symbols is the same in the other Examples, so that duplicated explanations are omitted.

TABLE 1

[Specifications]

|  | W | M | T |
|---|---|---|---|
| f = | 6.2 | 10.0 | 17.6 |
| FNO = | 2.97 | 3.72 | 5.24 |
| 2ω = | 65.7° | 41.9° | 24.2° |
| Bf = | 0.54506 (constant) | | |

[Lens Data]

| | r | d | νd | nd |
|---|---|---|---|---|
| 1 | 169.5207 | 1.0000 | 40.94 | 1.806100 |
| 2* | 4.3036 | 1.6000 | | |
| 3 | 7.9259 | 1.6000 | 22.76 | 1.808090 |
| 4 | 24.6773 | (D4) | | |
| 5* | 4.0670 | 2.0000 | 53.22 | 1.693500 |
| 6* | −15.8434 | 0.1000 | | |
| 7 | 24.7895 | 0.8000 | 28.27 | 2.003300 |
| 8 | 3.8309 | 0.7000 | | |
| 9 | −68.6946 | 1.2000 | 59.10 | 1.583320 |
| 10* | −6.1314 | (D10) | | |
| 11 | 0.0000 | 0.7600 | 64.20 | 1.516800 |
| 12 | 0.0000 | 0.5000 | | |
| 13 | 0.0000 | 0.5000 | 64.20 | 1.516800 |
| 14 | 0.0000 | (Bf) | | |

[Aspherical Data]

Surface Number: 2

κ = 0.8158
C4 = −6.54920E−04
C6 = −4.99880E−05
C8 = 1.74790E−06
C10 = −1.39860E−07

Surface Number: 5

κ = 0.3831
C4 = 1.88110E−04
C6 = 2.90520E−05
C8 = 0.00000E+00
C10 = 0.00000E+00

Surface Number: 6

κ = 1.0000
C4 = 2.60760E−03
C6 = −7.46670E−05
C8 = 9.42350E−07
C10 = 0.00000E+00

Surface Number: 10

κ = 3.3820
C4 = −1.66920E−04
C6 = 7.17250E−05
C8 = 0.00000E+00
C10 = 0.00000E+00

[Variable Distances]

| | W | M | T |
|---|---|---|---|
| f | 6.20 | 10.0 | 17.6 |
| D0 | ∞ | ∞ | ∞ |
| D4 | 10.57393 | 4.66186 | 0.49654 |
| D10 | 8.93466 | 12.19693 | 18.72145 |

[Values for Conditional Expressions]

(1): (r2 + r1)/(r2 − r1) =     −1.366
(2): S1/ft =     0.2386
(3): Fw × fw/(−f1) =     1.7097
(4): S2/ft =     0.2614

TABLE 1-continued (5): ν3 − ν4 =     24.95
(6): Z × (S1/d1) =     7.4516

Figure 4A:
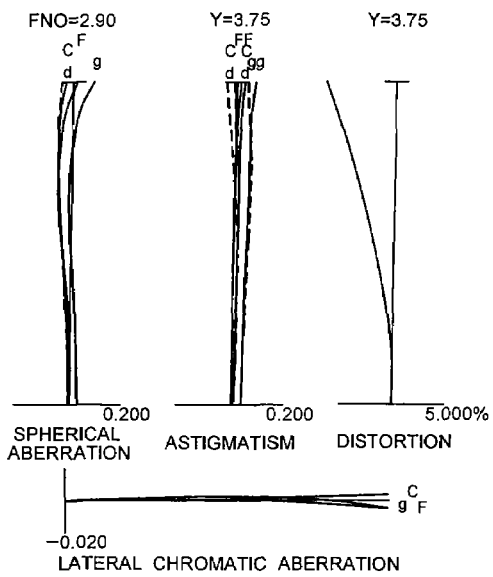
Figure 4A:
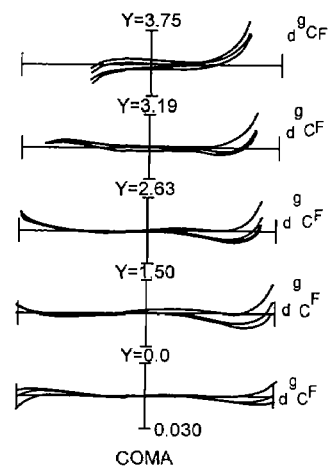
Figure 4B:
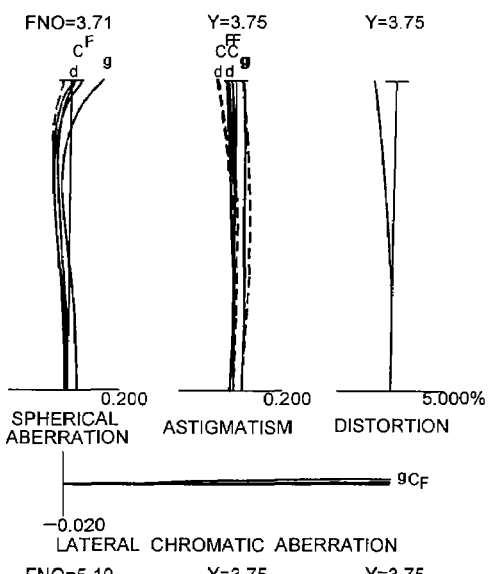
Figure 4B:
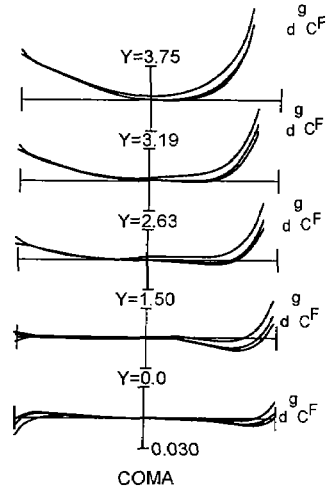
Figure 4C:
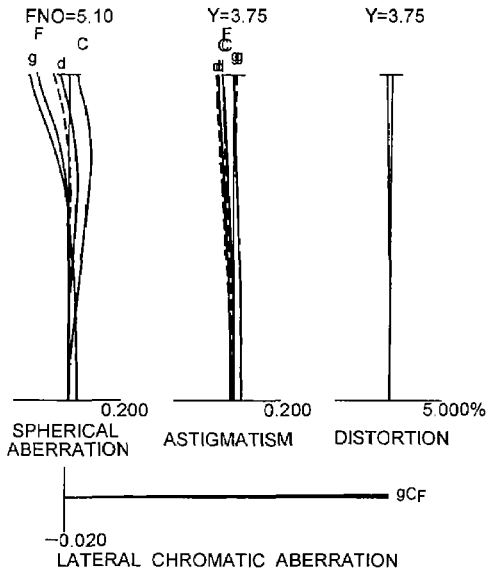
Figure 4C:
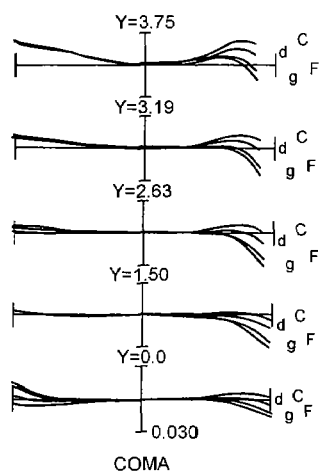

FIGS. 4A, 4B and 4C are graphs showing various aberrations of the zoom lens system according to Example 1 upon focusing on infinity, in which FIG. 4A shows a wide-angle end state, FIG. 4B shows an intermediate focal length state, and FIG. 4C shows a telephoto end state.

In respective graphs, FNO denotes a f-number, Y denotes an image height, d denotes an aberration curve at d-line (wavelength λ=587.6 nm), g denotes an aberration curve at g-line (wavelength λ=435.6 nm), C denotes an aberration curve at C-line (wavelength λ=656.3 nm), and F denotes an aberration curve at F-line (wavelength λ=486.1 nm). In graphs showing spherical aberration, the f-number with respect to the maximum diameter is shown. In graphs showing astigmatism and distortion, the maximum value of the image height Y is shown. In graphs showing coma, each image height Y is shown. In the graph showing astigmatism, a solid line indicates a sagittal image plane, and a broken line indicates a meridional image plane. The above-described explanation regarding various aberration graphs is the same as the other examples.

As is apparent from the respective graphs, the zoom lens system according to Example 1 shows superb optical performance as a result of good corrections to various aberrations over entire zooming range from the wide-angle end state W to the telephoto end state T.

EXAMPLE 2

Figure 5:
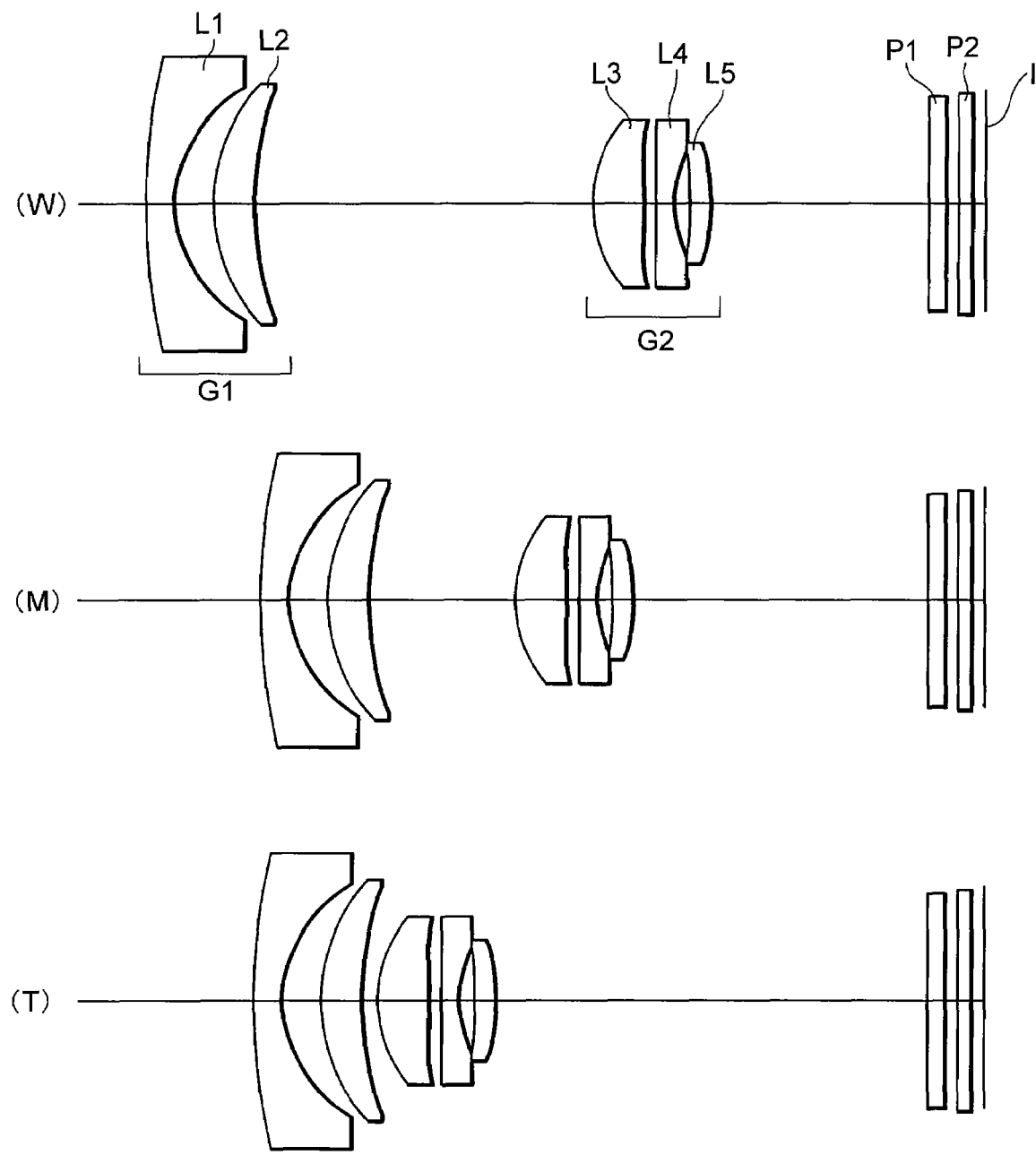
FIG. 5 is a diagram showing a lens configuration of a zoom lens system according to Example 2 of the present embodiment, in which W denotes a wide-angle end state, M denotes an intermediate focal length state, and T denotes a telephoto end state.

FIG. 5 is a diagram showing a lens configuration of a zoom lens system according to Example 2, in which W denotes a wide-angle end state, M denotes an intermediate focal length state, and T denotes a telephoto end state.

In FIG. 5, the zoom lens system according to Example 2 is composed of, in order from an object, a first lens group G1 having negative refractive power, and a second lens group G2 having positive refractive power. Upon varying a focal length from a wide-angle end state W to a telephoto end state T, the first lens group G1 and the second lens group G2 are moved along an optical axis such that a distance between the first lens group G1 and the second lens G2 decreases.

The first lens group G1 has negative refractive power as a whole, and is composed of two lenses that are, in order from the object, a negative meniscus lens L1 having a convex surface facing the object, and a positive meniscus lens L2 having a convex surface facing the object.

The second lens group G2 has positive refractive power as a whole, and is composed of three lenses that are, in order from the object, a double convex positive lens L3, a negative meniscus lens L4 having a convex surface facing the object, and a positive meniscus lens L5 having a concave surface facing the object. The three lenses are disposed without cemented with each other.

Between the second lens group G2 and the image plane I, there are provided a low-pass filter P1 for blocking higher spatial frequencies than that of resolution limit of a solid-state imaging device such as CCD disposed on the image plane I and a cover glass P2 for protecting the solid-state imaging device.

Various values associated with Example 2 are listed in Table 2.

TABLE 2

[Specifications]

| | W | M | T |
|---|---|---|---|
| f = | 6.2 | 9.5 | 17.5 |
| FNO = | 3 | 3.63 | 5.16 |
| 2ω = | 66.2° | 43.8° | 24.3° |
| Bf = | 0.44474 (constant) | | |

[Lens Data]

| | r | d | vd | nd |
|---|---|---|---|---|
| 1 | 34.0066 | 1.0000 | 40.10 | 1.851350 |
| 2* | 4.6337 | 1.5818 | | |
| 3 | 7.2587 | 1.6000 | 23.78 | 1.846660 |
| 4 | 15.2731 | (D4) | | |
| 5 | 4.8102 | 1.9000 | 53.22 | 1.693500 |
| 6* | −50.9451 | 0.5000 | | |
| 7 | 829.9079 | 0.8000 | 23.78 | 1.846660 |
| 8 | 5.3589 | 0.4500 | | |
| 9 | −31.7966 | 1.0000 | 40.51 | 1.730770 |
| 10* | −6.3270 | (D10) | | |
| 11 | 0.0000 | 0.6000 | 64.20 | 1.516800 |
| 12 | 0.0000 | 0.4000 | | |
| 13 | 0.0000 | 0.5000 | 64.20 | 1.516800 |
| 14 | 0.0000 | (Bf) | | |

[Aspherical Data]

Surface Number: 2

κ = 0.1076
C4 = 5.90390E−04
C6 = 2.69280E−06
C8 = 2.52330E−07
C10 = −2.85420E−09

Surface Number: 6

κ = 69.7065
C4 = 2.23550E−03
C6 = −3.11590E−05
C8 = 1.00000E−14
C10 = 1.00000E−16

Surface Number: 10

κ = 2.7090
C4 = 4.07910E−04
C6 = 4.57890E−05
C8 = 7.92210E−06
C10 = 1.00000E−16

[Variable Distances]

| | W | M | T |
|---|---|---|---|
| f | 6.20 | 9.5 | 17.5 |
| D0 | ∞ | ∞ | ∞ |
| D4 | 12.32519 | 5.88179 | 0.34771 |
| D10 | 9.05248 | 11.56102 | 17.64232 |

[Values for Conditional Expressions]

(1): (r2 + r1)/(r2 − r1) = −1.013
(2): S1/ft = 0.2390
(3): Fw × fw/(−f1) = 1.4790
(4): S2/ft = 0.2657
(5): ν3 − ν4 = 29.44
(6): Z × (S1/d1) = 7.4615

Figure 6A:
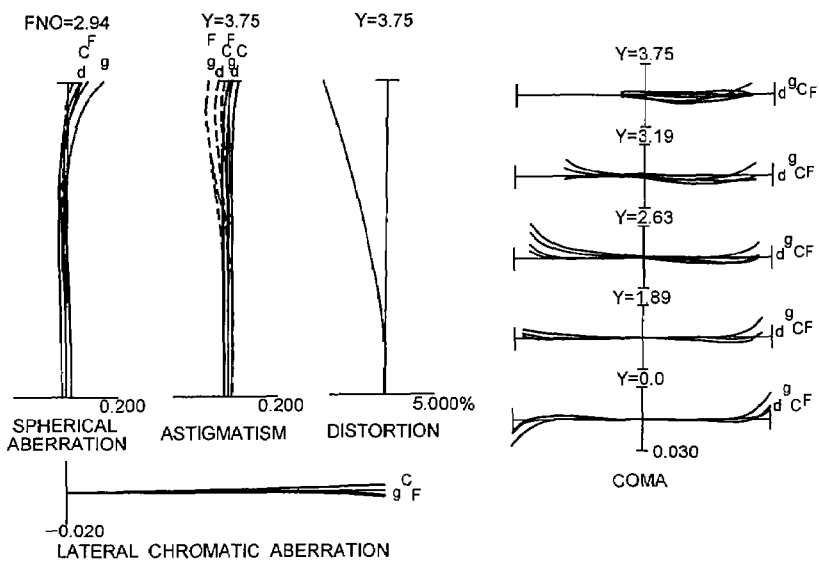
Figure 6B:
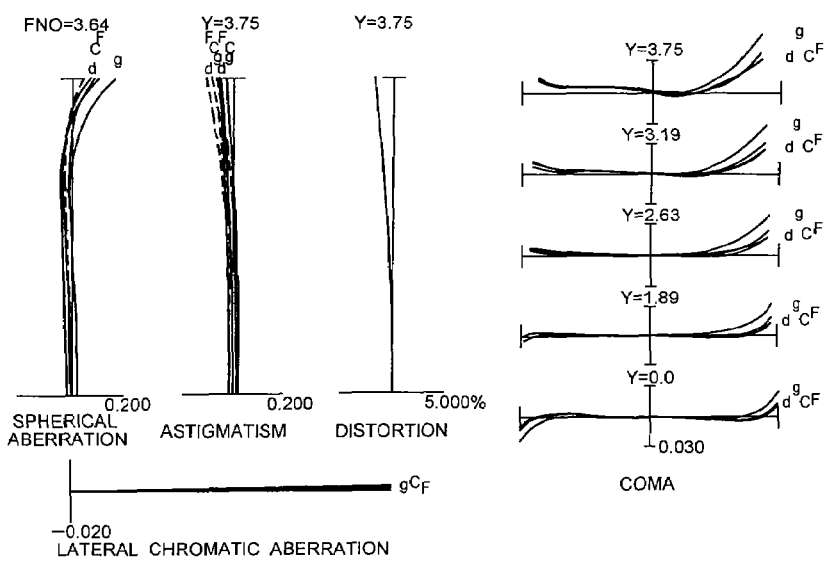
Figure 6C:
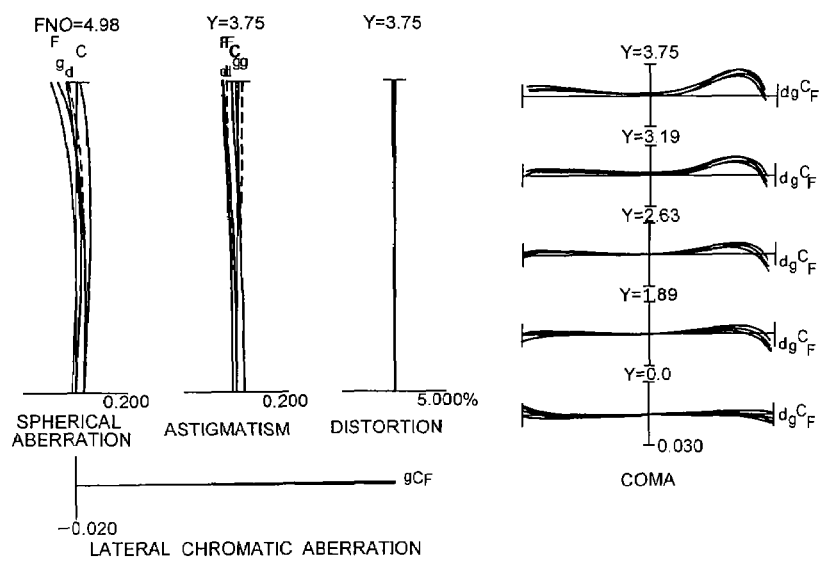

FIGS. 6A, 6B and 6C are graphs showing various aberrations of the zoom lens system according to Example 2 upon focusing on infinity, in which FIG. 6A shows a wide-angle end state, FIG. 6B shows an intermediate focal length state, and FIG. 6C shows a telephoto end state.

As is apparent from the respective graphs, the zoom lens system according to Example 2 shows superb optical performance as a result of good corrections to various aberrations over entire zooming range from the wide-angle end state W to the telephoto end state T.

EXAMPLE 3

Figure 7:
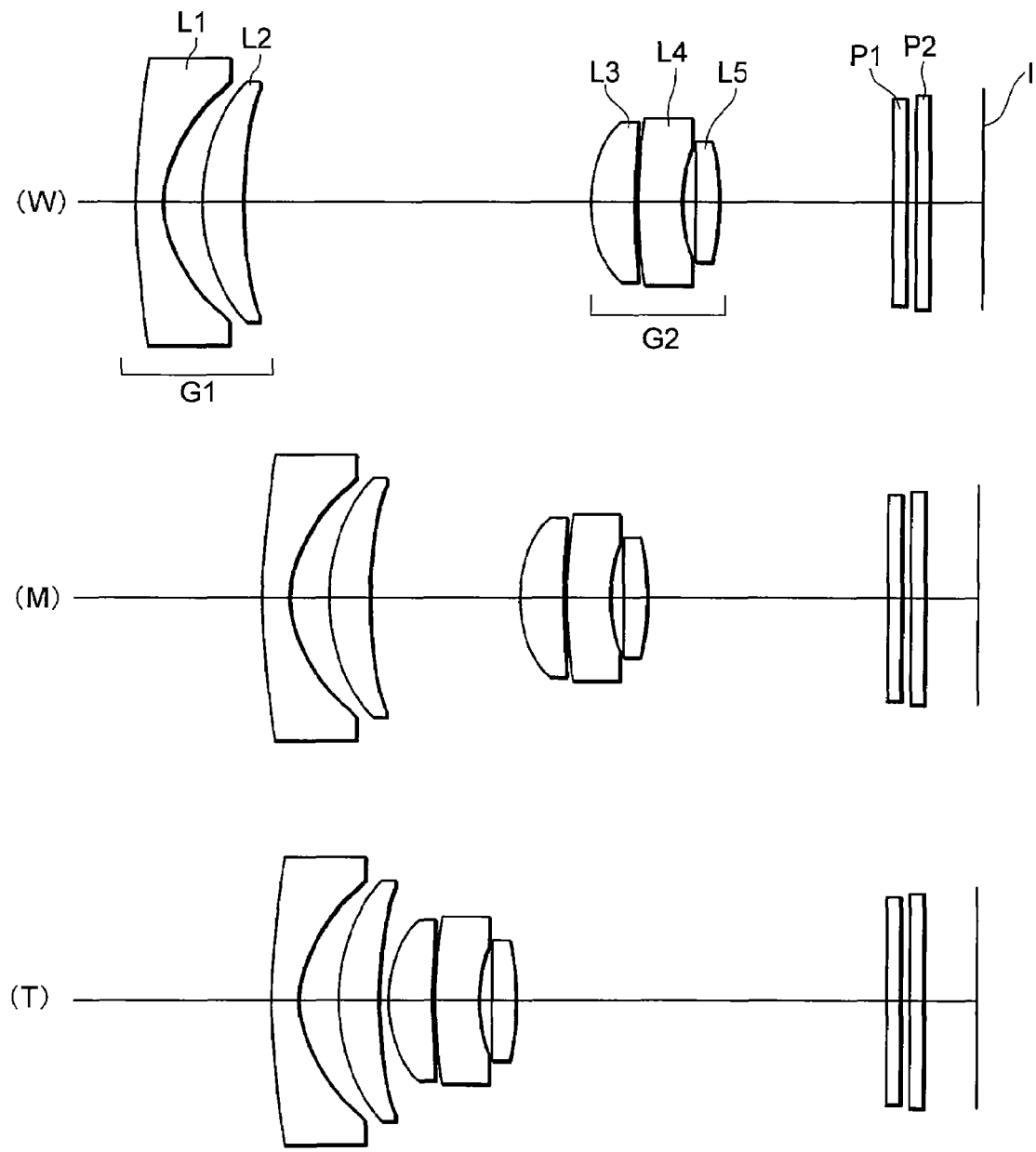
FIG. 7 is a diagram showing a lens configuration of a zoom lens system according to Example 3 of the present embodiment, in which W denotes a wide-angle end state, M denotes an intermediate focal length state, and T denotes a telephoto end state.

FIG. 7 is a diagram showing a lens configuration of a zoom lens system according to Example 3, in which W denotes a wide-angle end state, M denotes an intermediate focal length state, and T denotes a telephoto end state.

In FIG. 7, the zoom lens system according to Example 3 is composed of, in order from an object, a first lens group G1 having negative refractive power, and a second lens group G2 having positive refractive power. Upon varying a focal length from a wide-angle end state W to a telephoto end state T, the first lens group G1 and the second lens group G2 are moved along an optical axis such that a distance between the first lens group G1 and the second lens G2 decreases.

The first lens group G1 has negative refractive power as a whole, and is composed of two lenses that are, in order from the object, a negative meniscus lens L1 having a convex surface facing the object, and a positive meniscus lens L2 having a convex surface facing the object.

The second lens group G2 has positive refractive power as a whole, and is composed of three lenses that are, in order from the object, a positive meniscus lens L3 having a convex surface facing the object, a negative meniscus lens L4 having a convex surface facing the object, and a positive meniscus lens L5 having a concave surface facing the object. The three lenses are disposed without cemented with each other.

Between the second lens group G2 and the image plane I, there are provided a low-pass filter P1 for blocking higher spatial frequencies than that of resolution limit of a solid-state imaging device such as CCD disposed on the image plane I and a cover glass P2 for protecting the solid-state imaging device.

Various values associated with Example 3 are listed in Table 3.

TABLE 3

[Specifications]

| | W | M | T |
|---|---|---|---|
| f = | 5.9 | 9.5 | 17.0 |
| FNO = | 2.97 | 3.6 | 4.85 |
| 2ω = | 68.7° | 43.8° | 25.4° |
| Bf = | 2.0196 (constant) | | |

[Lens Data]

| | r | d | vd | nd |
|---|---|---|---|---|
| 1 | 42.3978 | 1.0000 | 40.10 | 1.851350 |
| 2* | 5.0211 | 1.5741 | | |
| 3 | 7.7993 | 1.6000 | 23.78 | 1.846660 |
| 4 | 17.1249 | (D4) | | |
| 5 | 4.8678 | 1.8000 | 53.22 | 1.693500 |
| 6* | 295.5644 | 0.1129 | | |
| 7 | 35.0414 | 1.7251 | 23.78 | 1.846660 |
| 8 | 5.3343 | 0.5199 | | |
| 9 | −157.7674 | 1.0000 | 53.22 | 1.693500 |
| 10* | −7.5470 | (D10) | | |
| 11 | 0.0000 | 0.6000 | 64.20 | 1.516800 |
| 12 | 0.0000 | 0.4000 | | |
| 13 | 0.0000 | 0.5000 | 64.20 | 1.516800 |
| 14 | 0.0000 | (Bf) | | |

TABLE 3-continued

[Aspherical Data]

Surface Number: 2

κ = 0.2715
C4 = 3.01900E−04
C6 = −1.83690E−07
C8 = 1.70190E−07
C10 = −2.11490E−09

Surface Number: 6

κ = −99.0000
C4 = 1.52900E−03
C6 = 3.78430E−06
C8 = −3.12870E−06
C10 = −8.78850E−08

Surface Number: 10

κ = −0.8775
C4 = −5.25150E−04
C6 = −8.72250E−06
C8 = 1.15980E−05
C10 = 8.70700E−07

[Variable Distances]

|  | W | M | T |
|---|---|---|---|
| f | 5.9 | 9.5 | 17.0 |
| D0 | ∞ | ∞ | ∞ |
| D4 | 13.88667 | 5.98922 | 0.40898 |
| D10 | 6.71122 | 9.27241 | 14.39479 |

[Values for Conditional Expressions]

| (1): (r2 + r1)/(r2 − r1) = | −1.359 |
|---|---|
| (2): S1/ft = | 0.2197 |
| (3): Fw × fw/(−f1) = | 1.5313 |
| (4): S2/ft = | 0.2715 |
| (5): ν3 − ν4 = | 29.44 |
| (6): Z × (S1/d1) = | 7.6409 |

Figure 8A:
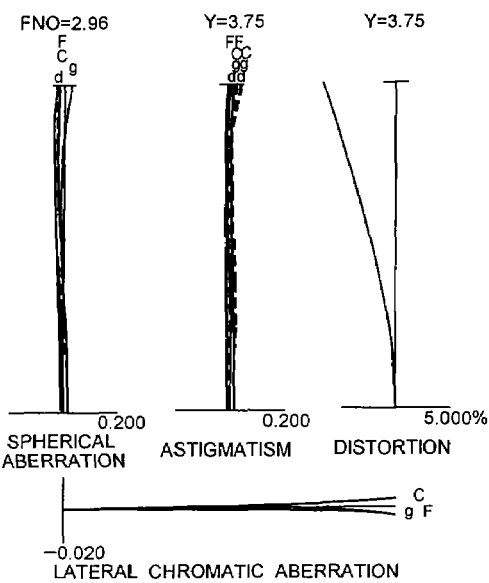
Figure 8A:
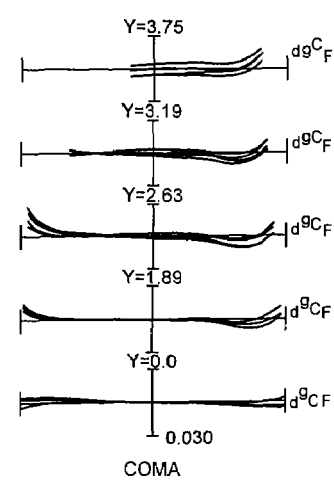
Figure 8B:
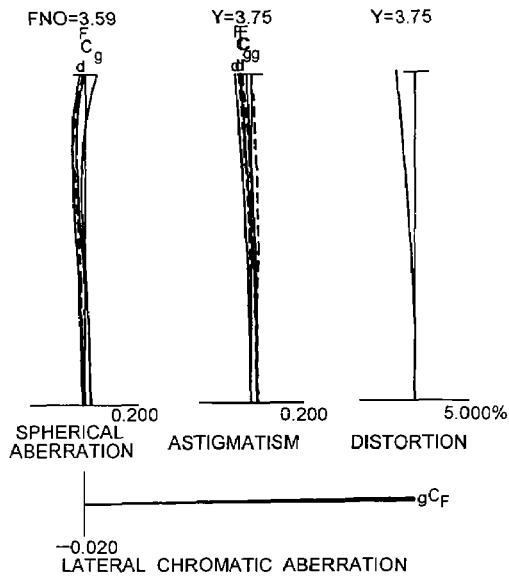
Figure 8B:
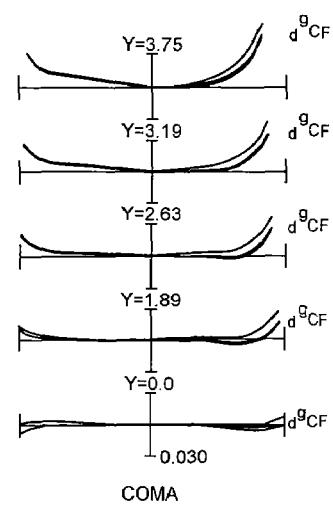
Figure 8C:
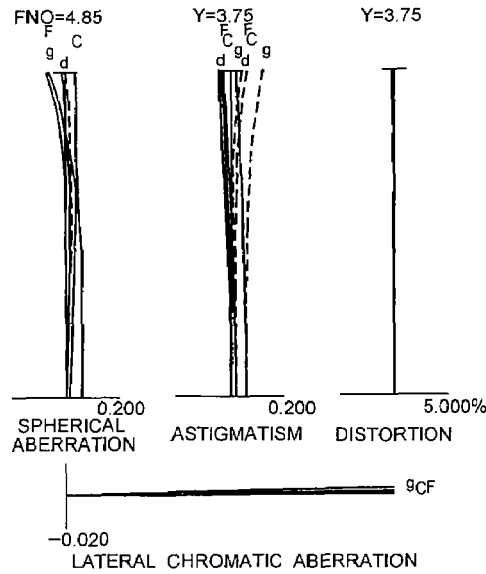
Figure 8C:
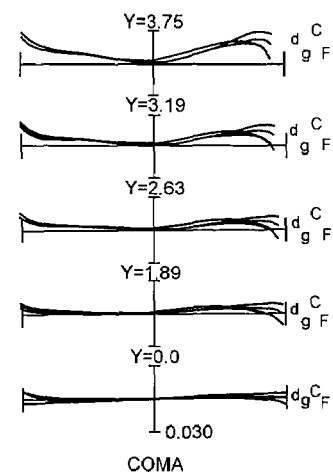

FIGS. 8A, 8B and 8C are graphs showing various aberrations of the zoom lens system according to Example 3 upon focusing on infinity, in which FIG. 8A shows a wide-angle end state, FIG. 8B shows an intermediate focal length state, and FIG. 8C shows a telephoto end state.

As is apparent from the respective graphs, the zoom lens system according to Example 3 shows superb optical performance as a result of good corrections to various aberrations over entire zooming range from the wide-angle end state W to the telephoto end state T.

EXAMPLE 4

Figure 9:
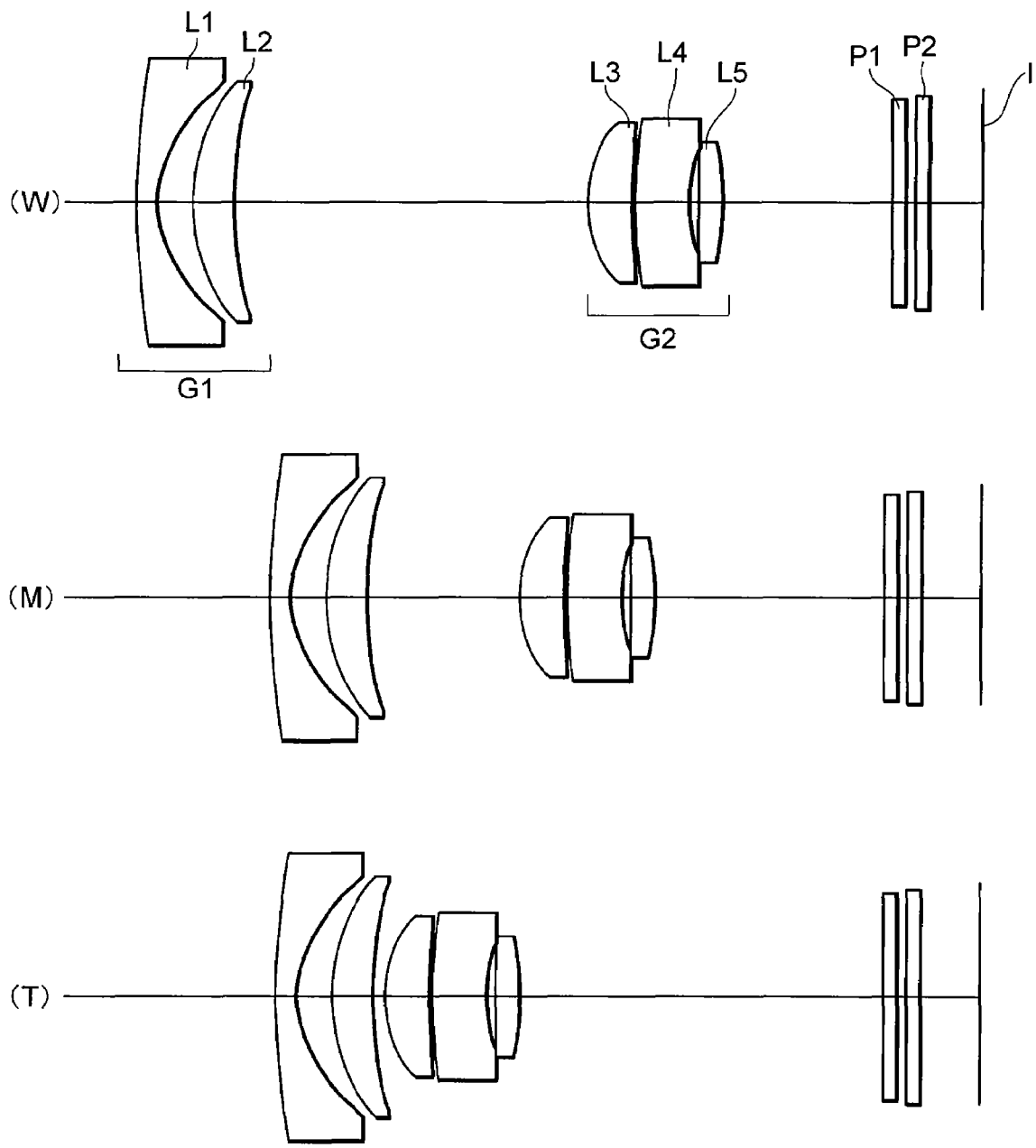
FIG. 9 is a diagram showing a lens configuration of a zoom lens system according to Example 4 of the present embodiment, in which W denotes a wide-angle end state, M denotes an intermediate focal length state, and T denotes a telephoto end state.

FIG. 9 is a diagram showing a lens configuration of a zoom lens system according to Example 4, in which W denotes a wide-angle end state, M denotes an intermediate focal length state, and T denotes a telephoto end state.

In FIG. 9, the zoom lens system according to Example 4 is composed of, in order from an object, a first lens group G1 having negative refractive power, and a second lens group G2 having positive refractive power. Upon varying a focal length from a wide-angle end state W to a telephoto end state T, the first lens group G1 and the second lens group G2 are moved along an optical axis such that a distance between the first lens group G1 and the second lens G2 decreases.

The first lens group G1 has negative refractive power as a whole, and is composed of two lenses that are, in order from the object, a negative meniscus lens L1 having a convex surface facing the object, and a positive meniscus lens L2 having a convex surface facing the object.

The second lens group G2 has positive refractive power as a whole, and is composed of three lenses that are, in order from the object, a double convex positive lens L3, a negative meniscus lens L4 having a convex surface facing the object, and a positive meniscus lens L5 having a concave surface facing the object. The three lenses are disposed without cemented with each other.

Between the second lens group G2 and the image plane I, there are provided a low-pass filter P1 for blocking higher spatial frequencies than that of resolution limit of a solid-state imaging device such as CCD disposed on the image plane I and a cover glass P2 for protecting the solid-state imaging device.

Various values associated with Example 4 are listed in Table 4.

TABLE 4

[Specifications]

|  | W | M | T |
|---|---|---|---|
| f = | 5.9 | 9.5 | 16.1 |
| FNO = | 3 | 3.6 | 4.8 |
| 2ω = | 68.6° | 43.8° | 26.3° |
| Bf = | 2.21961 (constant) | | |

[Lens Data]

|  | r | d | νd | nd |
|---|---|---|---|---|
| 1 | 39.1754 | 0.8000 | 40.10 | 1.851350 |
| 2* | 4.9052 | 1.4855 |  |  |
| 3 | 7.5398 | 1.5500 | 23.78 | 1.846660 |
| 4 | 16.6910 | (D4) |  |  |
| 5 | 4.8144 | 1.8000 | 60.69 | 1.591700 |
| 6* | −85.3335 | 0.1000 |  |  |
| 7 | 30.0000 | 2.0939 | 23.78 | 1.846660 |
| 8 | 5.7000 | 0.4000 |  |  |
| 9 | −74.8182 | 1.0000 | 53.22 | 1.693500 |
| 10* | −7.1904 | (D10) |  |  |
| 11 | 0.0000 | 0.6000 | 64.20 | 1.516800 |
| 12 | 0.0000 | 0.4000 |  |  |
| 13 | 0.0000 | 0.5000 | 64.20 | 1.516800 |
| 14 | 0.0000 | (Bf) |  |  |

[Aspherical Data]

Surface Number: 2

κ = 0.2861
C4 = 3.22250E−04
C6 = 9.38620E−08
C8 = 1.77640E−07
C10 = −2.11490E−09

Surface Number: 6

κ = −99.0000
C4 = 1.78000E−03
C6 = 1.02960E−05
C8 = −3.09510E−06
C10 = −8.78850E−08

Surface Number: 10

κ = −0.7543
C4 = −6.55320E−04
C6 = −2.15640E−05
C8 = 1.13680E−05
C10 = 8.70700E−07

[Variable Distances]

|  | W | M | T |
|---|---|---|---|
| f | 5.9 | 9.5 | 16.1 |
| D0 | ∞ | ∞ | ∞ |

TABLE 4-continued

| | | | |
|---|---|---|---|
| D4 | 13.88304 | 5.98559 | 0.67974 |
| D10 | 6.71112 | 9.27231 | 13.96783 |

[Values for Conditional Expressions]

| | |
|---|---|
| (1): (r2 + r1)/(r2 − r1) = | −1.469 |
| (2): S1/ft = | 0.2382 |
| (3): Fw × fw/(−f1) = | 1.3457 |
| (4): S2/ft = | 0.335 |
| (5): ν3 − ν4 = | 36.91 |
| (6): Z × (S1/d1) = | 7.0442 |

Figure 10A:
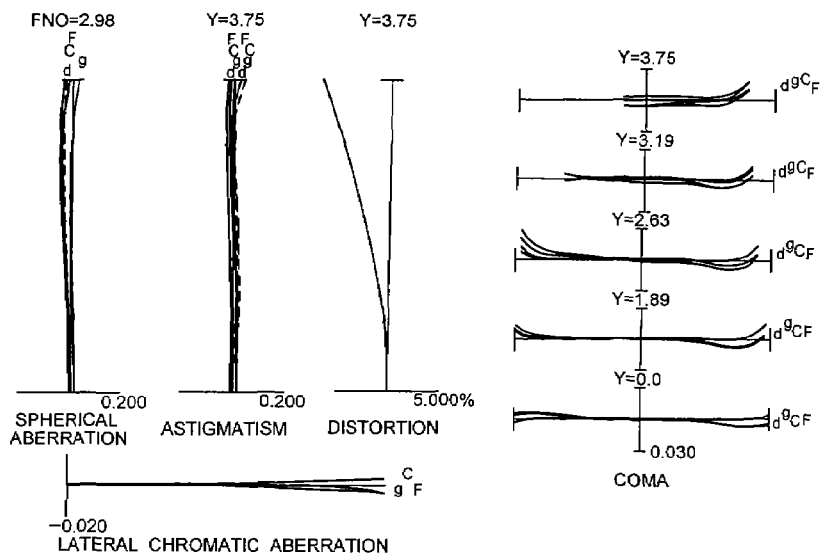
Figure 10B:
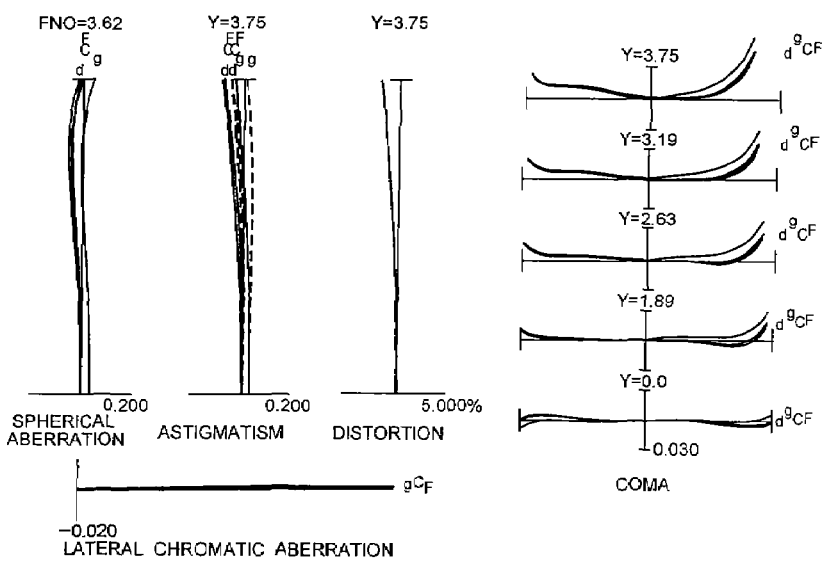
Figure 10C:
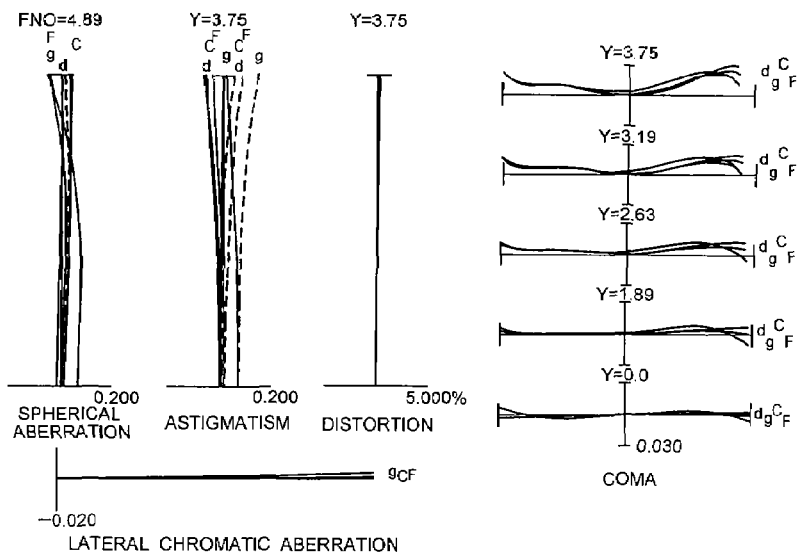

FIGS. 10A, 10B and 10C are graphs showing various aberrations of the zoom lens system according to Example 4 upon focusing on infinity, in which FIG. 10A shows a wide-angle end state, FIG. 10B shows an intermediate focal length state, and FIG. 10C shows a telephoto end state.

As is apparent from the respective graphs, the zoom lens system according to Example 4 shows superb optical performance as a result of good corrections to various aberrations over entire zooming range from the wide-angle end state W to the telephoto end state T.

EXAMPLE 5

Figure 11:
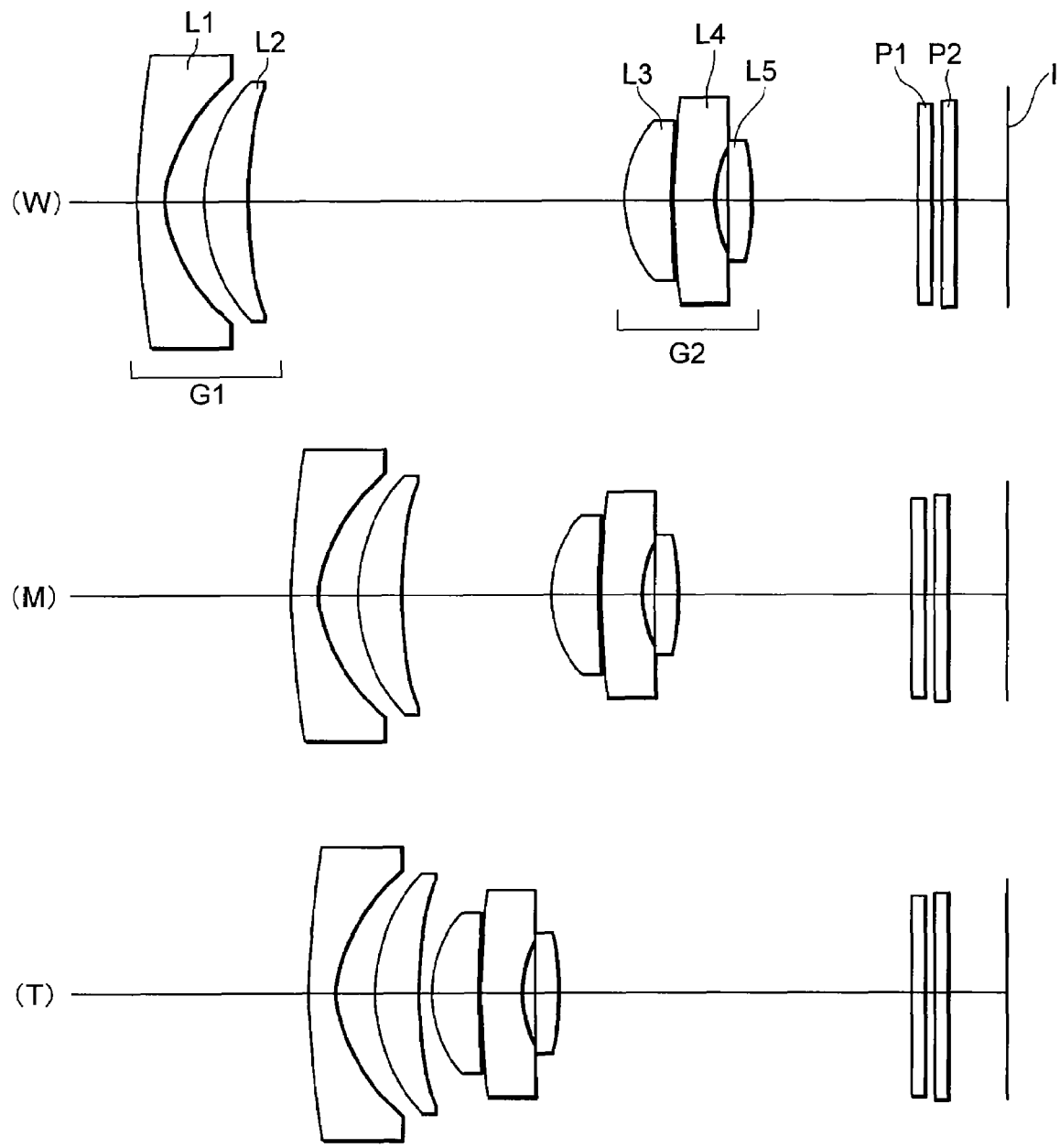
FIG. 11 is a diagram showing a lens configuration of a zoom lens system according to Example 5 of the present embodiment, in which W denotes a wide-angle end state, M denotes an intermediate focal length state, and T denotes a telephoto end state.

FIG. 11 is a diagram showing a lens configuration of a zoom lens system according to Example 5, in which W denotes a wide-angle end state, M denotes an intermediate focal length state, and T denotes a telephoto end state.

In FIG. 11, the zoom lens system according to Example 5 is composed of, in order from an object, a first lens group G1 having negative refractive power, and a second lens group G2 having positive refractive power. Upon varying a focal length from a wide-angle end state W to a telephoto end state T, the first lens group G1 and the second lens group G2 are moved along an optical axis such that a distance between the first lens group G1 and the second lens G2 decreases.

The first lens group G1 has negative refractive power as a whole, and is composed of two lenses that are, in order from the object, a negative meniscus lens L1 having a convex surface facing the object, and a positive meniscus lens L2 having a convex surface facing the object.

The second lens group G2 has positive refractive power as a whole, and is composed of three lenses that are, in order from the object, a double convex positive lens L3, a negative meniscus lens L4 having a convex surface facing the object, and a positive meniscus lens L5 having a concave surface facing the object. The three lenses are disposed without cemented with each other.

Between the second lens group G2 and the image plane I, there are provided a low-pass filter P1 for blocking higher spatial frequencies than that of resolution limit of a solid-state imaging device such as CCD disposed on the image plane I and a cover glass P2 for protecting the solid-state imaging device.

Various values associated with Example 5 are listed in Table 5.

TABLE 5

[Specifications]

| | W | M | T |
|---|---|---|---|
| f = | 5.6 | 9.5 | 16 |
| FNO = | 2.69 | 3.29 | 4.29 |
| 2ω = | 67.9° | 41.1° | 24.7° |
| Bf = | 2.27388 (constant) | | |

[Lens Data]

| | r | d | νd | nd |
|---|---|---|---|---|
| 1 | 39.6857 | 1.0500 | 40.10 | 1.851350 |
| 2* | 5.0888 | 1.6578 | | |
| 3 | 7.9288 | 1.6500 | 23.78 | 1.846660 |
| 4 | 16.7722 | (D4) | | |
| 5 | 4.8421 | 1.8000 | 53.22 | 1.693500 |
| 6* | 234.7727 | 0.1080 | | |
| 7 | 34.6361 | 1.7014 | 23.78 | 1.846660 |
| 8 | 5.2926 | 0.5000 | | |
| 9 | −301.0653 | 1.0000 | 53.22 | 1.693500 |
| 10* | −7.7243 | (D10) | | |
| 11 | 0.0000 | 0.7600 | 64.20 | 1.516800 |
| 12 | 0.0000 | 0.5000 | | |
| 13 | 0.0000 | 0.5000 | 64.20 | 1.516800 |
| 14 | 0.0000 | (Bf) | | |

[Aspherical Data]

Surface Number: 2

κ = 0.2707
C4 = 3.01792E−04
C6 = 5.54304E−07
C8 = 1.26526E−07
C10 = −1.36967E−09

Surface Number: 6

κ = −99.0000
C4 = 1.52083E−03
C6 = 9.20001E−07
C8 = −2.74051E−06
C10 = −8.78850E−08

Surface Number: 10

κ = −1.0035
C4 = −4.98255E−04
C6 = −1.32297E−05
C8 = 1.23281E−05
C10 = 8.52919E−07

[Variable Distances]

| | W | M | T |
|---|---|---|---|
| f | 5.6 | 9.5 | 16.0 |
| D0 | ∞ | ∞ | ∞ |
| D4 | 15.17873 | 6.04837 | 0.72232 |
| D10 | 6.46181 | 9.21966 | 13.81607 |

[Values for Conditional Expressions]

| | |
|---|---|
| (1): (r2 + r1)/(r2 − r1) = | −1.361 |
| (2): S1/ft = | 0.2724 |
| (3): Fw × fw/(−f1) = | 1.1351 |
| (4): S2/ft = | 0.3193 |
| (5): ν3 − ν4 = | 29.44 |
| (6): Z × (S1/d1) = | 7.5099 |

Figure 12A:
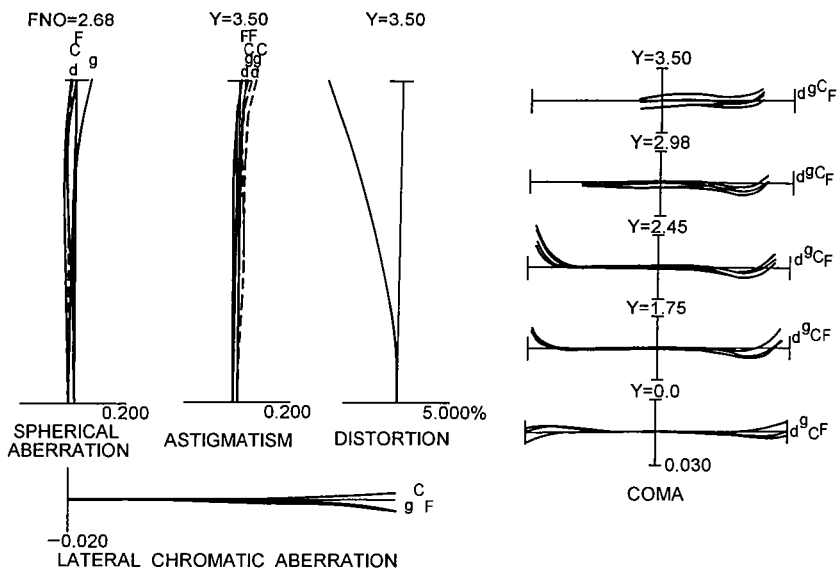
Figure 12B:
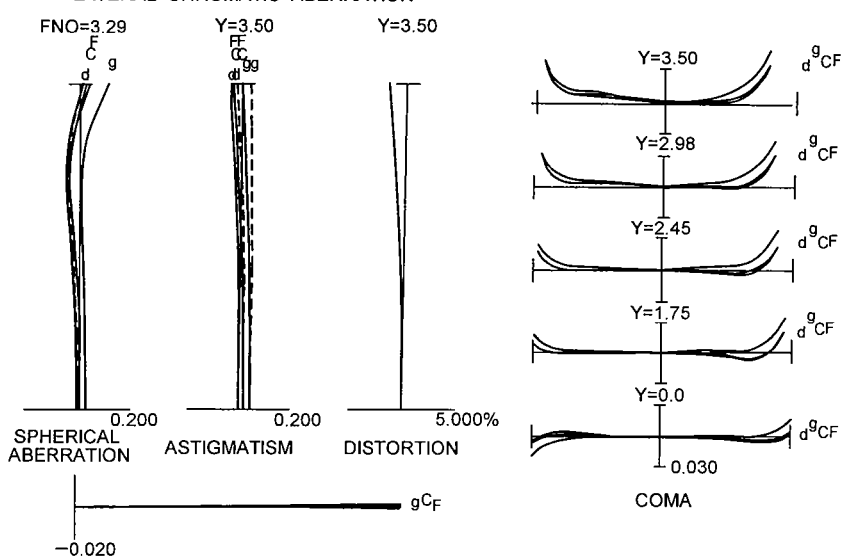
Figure 12C:
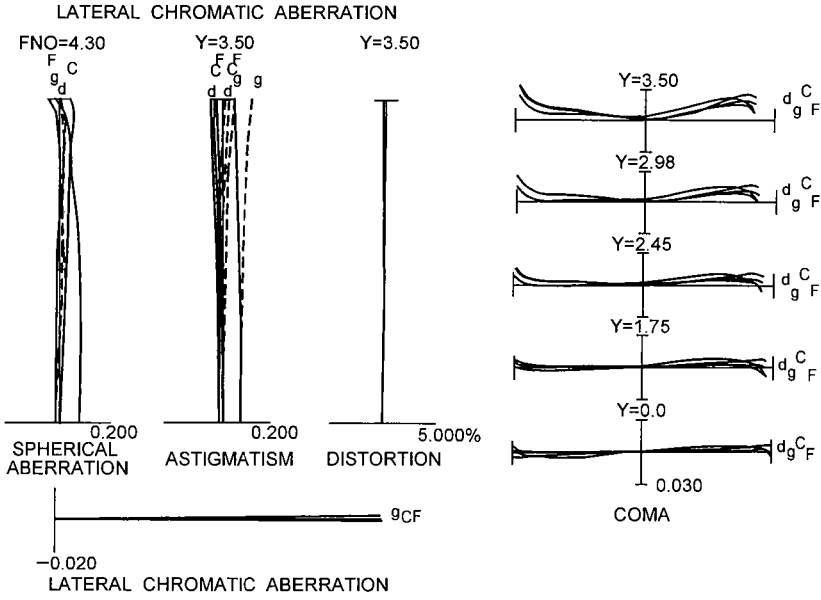

FIGS. 12A, 12B and 12C are graphs showing various aberrations of the zoom lens system according to Example 5 upon focusing on infinity, in which FIG. 12A shows a wide-angle end state, FIG. 12B shows an intermediate focal length state, and FIG. 12C shows a telephoto end state.

As is apparent from the respective graphs, the zoom lens system according to Example 5 shows superb optical performance as a result of good corrections to various aberrations over entire zooming range from the wide-angle end state W to the telephoto end state T.

As described above, the present embodiment makes it possible to provide a zoom lens system having high optical performance with accomplishing to be compact, lightweight, and slim upon being accommodated in a camera body, and to provide a method for varying a focal length of the zoom lens system, and a camera equipped with the zoom lens system.

Incidentally, the following description may suitably be applied within limits that do not deteriorate optical performance.

In order to carry out focusing from infinity to a close-range object, a portion of a lens group, a single lens group, or a plurality of lens groups may be moved along the optical axis. The focusing lens group(s) may be used for auto focus, and suitable for being driven by a motor such as an ultrasonic motor. In a zoom lens system according to the present embodiment, the first lens group may preferably be used for the focusing lens group.

In a zoom lens system according to present embodiment, in order to correct an image blur caused by a camera shake, a portion of a lens group, or a single lens group may be moved as a vibration reduction lens group in a direction perpendicular to the optical axis. In a zoom lens system according to present embodiment, it is preferable that the second lens group is used for the vibration reduction lens group.

Moreover, any lens surface may be formed as an aspherical surface. The aspherical surface may be fabricated by a fine grinding process, a glass molding process that a glass material is formed into an aspherical shape by a mold, or a compound type process that a resin material is formed into an aspherical shape on a glass lens surface.

Moreover, although an aperture stop is preferably disposed in the vicinity of the second lens group, the function may be substituted by a lens frame without disposing a member as the aperture stop.

An antireflection coating having high transmittance over a broad wavelength range may be applied to each lens surface to reduce flare or ghost images, so that high optical performance with a high contrast can be attained.

The present embodiment only shows a specific example for the purpose of better understanding of the present invention. Accordingly, it is needless to say that the invention in its broader aspect is not limited to the specific details and representative devices shown and described herein, and various modifications may be made without departing from the spirit or scope of the general inventive concept as defined by the appended claims and their equivalents.

What is claimed is:

1. A zoom lens system consisting of, in order from an object:
   a first lens group having negative refractive power; and
   a second lens group having positive refractive power;
   upon varying a focal length from a wide-angle end state to a telephoto end state, a distance between the first lens group and the second lens group decreasing;
   the first lens group consisting of, in order from the object, a first lens having negative refractive power, and a second lens having positive refractive power,
   the second lens group consisting of three lenses that are, in order from the object, a third lens having positive refractive power, a fourth lens having negative refractive power and having a convex surface facing the object, and a fifth lens having positive refractive power,
   the three lenses being disposed without cemented with each other, and
   the following conditional expression is satisfied:

$-1.48 < (r2+r1)/(r2-r1) < -1.359$ where r1 denotes a radius of curvature of the object side surface of the fourth lens, and r2 denotes a radius of curvature of the image side surface of the fourth lens.

2. The zoom lens system according to claim 1, wherein the following conditional expression is satisfied:

$0.20 < S1/ft < 0.32$ where S1 denotes a thickness of the first lens group, and ft denotes a focal length of the zoom lens system in the telephoto end state.

3. The zoom lens system according to claim 1, wherein the following conditional expression is satisfied:

$1.00 < Fw \times fw/(-f1) < 1.90$ where Fw denotes an f-number of the zoom lens system in the wide-angle end state, fw denotes a focal length of the zoom lens system in the wide-angle end state, and f1 denotes a focal length of the first lens group.

4. The zoom lens system according to claim 1, wherein the following conditional expression is satisfied:

$0.20 < S2/ft < 0.35$ where S2 denotes a thickness of the second lens group, and ft denotes a focal length of the zoom lens system in the telephoto end state.

5. The zoom lens system according to claim 1, wherein the following conditional expression is satisfied:

$20 < v3 - v4 < 37$ where v3 denotes Abbe number of the third lens at d-line, in which the wavelength $\lambda = 587.6$ nm, v4 denotes Abbe number of the fourth lens at d-line, in which the wavelength $\lambda = 587.6$ nm.

6. The zoom lens system according to claim 1, wherein the third lens has an aspherical surface.

7. The zoom lens system according to claim 1, wherein the image side surface of the third lens is an aspherical surface.

8. The zoom lens system according to claim 1, wherein the image side surface of the first lens is an aspherical surface.

9. The zoom lens system according to claim 1, wherein the fifth lens is a meniscus lens having a concave surface facing the object.

10. The zoom lens system according to claim 1, wherein refractive index of the fourth lens is 1.80 or more.

11. An optical apparatus including a zoom lens system, the zoom lens system consisting of, in order from an object:
    a first lens group having negative refractive power; and
    a second lens group having positive refractive power;
    upon varying a focal length from a wide-angle end state to a telephoto end state, a distance between the first lens group and the second lens group decreasing;
    the first lens group consisting of, in order from the object, a first lens having negative refractive power, and a second lens having positive refractive power,
    the second lens group consisting of three lenses that are, in order from the object, a third lens having positive refractive power, a fourth lens having negative refractive power and having a convex surface facing the object, and a fifth lens having positive refractive power,
    the three lenses being disposed without cemented with each other, and
    the following conditional expression is satisfied:

$-1.48 < (r2+r1)/(r2-r1) < -1.359$ where r1 denotes a radius of curvature of the object side surface of the fourth lens, and r2 denotes a radius of curvature of the image side surface of the fourth lens.

12. A method for varying a focal length of a zoom lens system, the method comprising steps of:

providing the zoom lens system that consists of, in order from an object, a first lens group having negative refractive power, and a second lens group having positive refractive power, the first lens group consisting of, in order from the object, a first lens having negative refractive power and a second lens having positive refractive power, the second lens group consisting of three lenses that are, in order from the object, a third lens having positive refractive power, a fourth lens having negative refractive power, and a fifth lens having positive refractive power, the three lenses in the second lens group not being cemented with each other, the following conditional expression being satisfied:

$$-1.48<(r2+r1)/(r2-r1)<-1.359$$

where r1 denotes a radius of curvature of the object side surface of the fourth lens, and r2 denotes a radius of curvature of the image side surface of the fourth lens; and varying a focal length from a wide-angle end state to a telephoto end state by decreasing a distance between the first lens group and the second lens group.

13. The method according to claim 12, wherein the following conditional expression is satisfied:

$$0.20<S1/ft<0.32$$

where S1 denotes a thickness of the first lens group, and ft denotes a focal length of the zoom lens system in the telephoto end state.

14. The method according to claim 12, wherein the following conditional expression is satisfied:

$$1.00<Fw \times fw/(-f1)<1.90$$

where Fw denotes an f-number of the zoom lens system in the wide-angle end state, fw denotes a focal length of the zoom lens system in the wide-angle end state, and f1 denotes a focal length of the first lens group.

15. The method according to claim 12, wherein the following conditional expression is satisfied:

$$0.20<S2/ft<0.35$$

where S2 denotes a thickness of the second lens group, and ft denotes a focal length of the zoom lens system in the telephoto end state.

16. The method according to claim 12, wherein the following conditional expression is satisfied:

$$20<v3-v4<37$$

where v3 denotes Abbe number of the third lens at d-line, in which the wavelength $\lambda$=587.6 nm, v4 denotes Abbe number of the fourth lens at d-line, in which the wavelength $\lambda$=587.6 nm.

17. The method according to claim 12, wherein the third lens has an aspherical surface.

18. The method according to claim 12, wherein the image side surface of the third lens is an aspherical surface.

19. The method according to claim 12, wherein the image side surface of the first lens is an aspherical surface.

20. The method according to claim 12, wherein the fifth lens has a meniscus shape having a concave surface facing the object.

21. The method according to claim 12, wherein refractive index of the fourth lens is 1.80 or more.

* * * * *